(12) United States Patent
Pollak et al.

(10) Patent No.: US 8,498,134 B2
(45) Date of Patent: *Jul. 30, 2013

(54) VOLTAGE CONVERTER CIRCUIT AND METHOD FOR A CLOCK SUPPLY OF ENERGY TO AN ENERGY STORAGE

(75) Inventors: Markus Pollak, Erlangen (DE); Loreto Mateu, Nuremberg (DE); Peter Spies, Herzogenaurach (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 410 days.

This patent is subject to a terminal disclaimer.

(21) Appl. No.: 12/919,501
(22) PCT Filed: May 4, 2009
(86) PCT No.: PCT/EP2009/003190
§ 371 (c)(1),
(2), (4) Date: Sep. 3, 2010
(87) PCT Pub. No.: WO2009/138180
PCT Pub. Date: Nov. 19, 2009

(65) Prior Publication Data
US 2010/0328972 A1    Dec. 30, 2010

Related U.S. Application Data

(63) Continuation-in-part of application No. 12/120,853, filed on May 15, 2008, now Pat. No. 7,977,920.

(30) Foreign Application Priority Data

May 15, 2008  (DE) .......................... 10 2008 023 515
Jun. 23, 2008  (DE) .......................... 10 2008 029 598

(51) Int. Cl.
*H02M 1/00* (2007.01)
*H02M 3/335* (2006.01)
*H02M 7/537* (2006.01)

(52) U.S. Cl.
USPC ............................... 363/49; 363/16; 363/131

(58) Field of Classification Search
USPC ............................ 363/16, 49, 131
See application file for complete search history.

(56) References Cited

U.S. PATENT DOCUMENTS 3,461,377 A    8/1969  Reese
(Continued)

FOREIGN PATENT DOCUMENTS

DE    1 155 850    10/1963
(Continued)

OTHER PUBLICATIONS

English translation of Official Communication issued in corresponding International Application PCT/EP2009/003190, mailed on Dec. 16, 2010.

(Continued)

*Primary Examiner* — Adolf Berhane
*Assistant Examiner* — Emily Pham
(74) *Attorney, Agent, or Firm* — Keating & Bennett, LLP

(57) ABSTRACT

The present invention provides a voltage converter circuit for the clocked supply of energy to an energy storage based on an input voltage applied at an input applied at an input of the voltage converter circuit. The voltage converter circuit includes an energy storage and a switch arrangement, wherein the switch arrangement has a first switch and a second switch which are connected in parallel to each other and coupled to the energy storage. The first switch of the switch arrangement has a smaller turn-on voltage according to amount than the second switch, wherein a control terminal of the first switch is wired up such that the first switch is active in a startup phase of the voltage converter circuit to supply energy to the energy storage, and wherein a control terminal of the second switch is wired up such that the second switch is active after the startup phase to supply energy to the energy storage in a clocked way. Further, the voltage converter circuit has a feedback circuit which is implemented to provide a feedback signal depending on a change of the energy stored in the energy storage or depending on an amount of energy stored in the energy storage, wherein the feedback circuit has a switchable coupling element which is implemented to couple the feedback signal to the control terminal of the second switch, and wherein the switchable coupling element is implemented to provide a stronger coupling effect in a startup phase than after the startup phase.

18 Claims, 11 Drawing Sheets

U.S. PATENT DOCUMENTS

| | | | |
|---|---|---|---|
| 6,107,593 A * | 8/2000 | Tsai et al. | 219/69.13 |
| 7,170,762 B2 * | 1/2007 | Chian et al. | 363/19 |
| 7,977,920 B2 * | 7/2011 | Pollak et al. | 320/140 |
| 2005/0041437 A1 | 2/2005 | Chian et al. | |
| 2007/0147099 A1 | 6/2007 | Tai et al. | |
| 2007/0210774 A1 | 9/2007 | Kimura et al. | |

FOREIGN PATENT DOCUMENTS

| | | |
|---|---|---|
| DE | 2 204 019 A1 | 8/1972 |
| GB | 1 341 327 A | 12/1973 |
| JP | 2003-111298 A | 4/2003 |

OTHER PUBLICATIONS

Official Communication issued in International Patent Application No. PCT/EP2009/003190, mailed on Sep. 4, 2009.

* cited by examiner

80 — Supplying energy to an energy storage based on an input voltage at a voltage converter circuit, by activating a first switch, wherein the switch comprises a smaller turn-on voltage than a second switch, according to amount.

85 — Supplying energy in a clocked way to the energy storage of the voltage converter circuit by activating a second switch, wherein activating the second switch in the start-up phase includes coupling a feedback signal to the control terminal of the second switch via a coupling, wherein the method includes reducing the coupling after the start-up phase, wherein the second switch is connected in parallel to the first switch and the second switch comprises a greater turn-on voltage than the first switch, according to amount.

FIGURE 10

VOLTAGE CONVERTER CIRCUIT AND METHOD FOR A CLOCK SUPPLY OF ENERGY TO AN ENERGY STORAGE

BACKGROUND OF THE INVENTION

Embodiments according to the invention relate to a voltage converter circuit for a clocked supply of energy to an energy storage based on an input voltage. Such a voltage converter circuit may, for example, be used in connection with an up-conversion of an output voltage of an energy source, like, e.g., that of a thermal generator, a fuel cell or a solar cell. Further, embodiments according to the present invention relate to a method for the clocked supply of energy to an energy storage.

The technical field of use of embodiments according to the invention may, for example, be a voltage converter circuit which may already convert this voltage with regard to its voltage value at a low or lower input voltage, respectively. Embodiments according to the invention may be an up-voltage converter with coupled coils which provides at its output a higher voltage than the one applied to its input. Here, the voltage converter may be coupled to energy sources, like, e.g., thermal generators or solar cells, which only provide a very low output voltage as an input voltage for the voltage converter. By the use of an inventive voltage converter circuit, with still lower dimensions of the voltage converter, high efficiency may be achieved. The technical field of use may, as it is illustrated in further embodiments of the invention, be the setup of a self-oscillating voltage converter, which may start at operating voltages below a threshold voltage of a switching transistor of the voltage converter and still provide efficiencies of more than 70% with comparative circuit dimensions. Conventional, integrated DC/DC up-converters may have a low efficiency if, for example, they work with input voltages below 1 V.

Conventional DC/DC up-converters are available as integrated circuits which operate starting from an input voltage of approx. 300 mV. The efficiency of these DC/DC up-converters is usually low, however. DC/DC converters which are used in conventional devices like, e.g., mobile phones, laptops, etc., are, except for at least one external coil, available fully integrated on a chip. They offer high efficiencies with input voltages above 1.8 V. Input voltages below that, however, cause a rapid decrease of the efficiency here. This means that energy sources, like, e.g., solar cells and thermal generators, have to be connected cascadedly to provide a usable voltage for a DC/DC converter or up-converter, respectively. In particular with the thermal generators, this is only possible restrictedly, if the dimensions of the overall system are to be kept low. There is thus a need for a voltage converter circuit for energy sources which provide only a very low output voltage, wherein this low output voltage may be converted with a high efficiency into a changed output voltage of the voltage converter circuit, having at the same time low dimensions.

A self-oscillating voltage converter which can do without an active circuit for controlling the switching transistor for the voltage conversion and builds up oscillation itself may, for example, operate at 300 mV, but for building up oscillation for the circuit a clearly higher input voltage is requested. This starting voltage conventionally directly depends on the threshold voltage of the switching transistor, as the switching transistor may not supply current requested for startup below that. The starting voltage, apart from that, directly depends on the turns ratio of the transformer of the voltage converter circuit, which is formed from the coupling of the transformer coils. If a voltage converter circuit is to start as soon as possible, a high turns ratio in a range of, for example, 1:10 is needed. By this, when starting up, the low input voltage is up-transformed to clock the switching transistor through. When the desired output voltage has been achieved, the switching transistor at its control (gate) terminal is virtually stressed with the output voltage of the converter multiplied by the turns ratio, i.e., for example, 20 V, with an output voltage of 2 V and a turns ratio of 1:10. These occurring control (gate) voltages are not needed in a static operation for switching the transistor and lead to high switching losses.

SUMMARY

According to an embodiment a voltage converter circuit for a clocked supply of energy to an energy storage based on an input voltage applied at an input of the voltage converter circuit may have an energy storage; a switch arrangement, wherein the switch arrangement has a first switch and a second switch which are connected in parallel, wherein the switch arrangement is coupled to the energy storage, wherein the first switch has a turn-on voltage which is smaller, according to amount, than the second switch, wherein a control terminal of the first switch is wired up such that the first switch is active in a startup phase of the voltage converter circuit to supply energy to the energy storage, and wherein a control terminal of the second switch is wired up such that the second switch is active after the startup phase to supply energy to the energy storage in a clocked way; and a feedback circuit which is implemented to provide a feedback signal depending on a change of the energy stored in the energy storage or depending on an amount of energy stored in the energy storage, wherein the feedback circuit has a switchable coupling element which is implemented to couple the feedback signal to the control terminal of the second switch, wherein the switchable coupling element is implemented to provide a stronger coupling effect in a startup phase than after the startup phase.

According to another embodiment a method for a clocked supply of energy to an energy storage, based on an input voltage applied at an input of a voltage converter circuit may have the steps of supplying energy to the energy storage of the voltage converter circuit in a startup phase by activating a first switch; and supplying energy in a clocked way to the energy storage of the voltage converter circuit by activating a second switch, wherein activating the second switch in the startup phase includes coupling a feedback signal to the control terminal of the second switch via a coupling, and wherein the method includes a reduction of the coupling after the startup phase, wherein the second switch is connected in parallel to the first switch and the second switch has a higher turn-on voltage than the first switch, according to amount.

According to another embodiment a voltage converter circuit for a clocked supply of energy to an energy storage based on an input voltage which is applied to an input of the voltage converter circuit may have an energy storage; a switch arrangement having a control terminal, wherein the switch arrangement is coupled to the energy storage to supply energy in a switchable way to the energy storage depending on a control signal applied to the control terminal; a feedback circuit which is implemented to provide a feedback signal depending on a change of the energy stored in the energy storage or depending on an amount of energy stored in the energy storage, wherein the feedback circuit has a switchable coupling element which is implemented to couple the feedback signal to the control terminal, and wherein the switchable coupling element is implemented to provide a stronger coupling effect in a startup phase of the voltage conversion than after the startup phase; wherein the feedback circuit has a switchable capacitive element which is implemented to couple the voltage induced in the inductive element to the control terminal of the switch arrangement, and wherein the switchable capacitive element is implemented to provide a stronger coupling effect between the inductive element and the control terminal in the startup phase than after the startup phase, by increasing the overall capacity of the capacitive element in the startup phase of the voltage converter circuit.

According to another embodiment a method for the clocked supply of energy to an energy storage based on an input voltage applied at an input of a voltage converter circuit may have the steps of supplying energy in a switchable way to the energy storage of the voltage converter circuit depending on a control signal, providing a feedback signal depending on a change of the energy stored in the energy storage or depending on an amount of energy stored in the energy storage, and coupling the feedback signal to the control terminal of the voltage converter circuit using a switchable, capacitive element, to acquire the control signal, wherein in a startup phase a stronger coupling effect between the feedback signal and the control terminal is provided than after the startup phase, by increasing the overall capacity of the capacitive element in the start-up phase.

The present invention provides a voltage converter circuit for the clocked supply of energy to an energy storage based on an input voltage which is applied to an input of the voltage converter circuit. The voltage converter circuit includes an energy storage and a switch arrangement having a control terminal. The switch arrangement is coupled to the energy storage. Further, the voltage converter circuit comprises a feedback circuit to provide a feedback signal. The feedback circuit includes a switchable coupling element to couple the feedback signal to the control terminal, wherein the switchable coupling element provides a stronger coupling effect in a startup phase of the voltage conversion than after the startup phase.

Embodiments according to the invention presented here enable, in a self-oscillating DC/DC up-converter, a low startup voltage with simultaneously a high efficiency of the overall arrangement. Due to the low number of components, it may apart from that be used in discretely set-up DC/DC converters.

The present invention further provides a voltage converter circuit for a clocked supply of energy to an energy storage based on an input voltage which is applied to an input of the voltage converter circuit. The voltage converter circuit includes an energy storage and a switch arrangement, wherein the switch arrangement comprises a first switch and a second switch which are connected in parallel to each other. The switch arrangement is coupled to the energy storage. The first switch comprises a smaller input voltage according to amount than the second switch. A control terminal of the first switch is wired up in such a way that the first switch is active in a startup phase of the voltage converter circuit to supply energy to the energy storage. A control terminal of the second switch is wired up in such a way that the second switch is active after the startup phase to supply energy to the energy storage in a clocked way.

The present invention further provides a method for a clocked supply of energy to an energy storage based on an input voltage which is applied to an input of a voltage converter circuit. The method comprises a step of supplying energy to the energy storage of the voltage converter circuit in a startup phase by activating a first switch, wherein the first switch comprises a smaller turn-on voltage according to amount than a second switch. Further, the method comprises a supply of energy, in a clocked way, to the energy storage of the voltage converter circuit after the startup phase, by activating the second switch. The second switch is switched in parallel to the first switch and comprises, according to amount, a greater turn-on voltage than the first switch.

Further, the present invention provides a further method for a clocked supply of energy to an energy storage based on an input voltage which is applied to an input of a voltage converter circuit. The further method comprises a step of supplying energy, in a clocked way, to the energy storage depending on a control signal applied to a control terminal of a switch arrangement. Further, the further method comprises providing a feedback signal with a feedback circuit depending on a change of the energy stored in the energy storage or depending on an amount of energy stored in the energy storage. Providing may take place using a switchable coupling element of the feedback circuit, wherein the feedback signal is coupled to the control terminal. The switchable coupling element provides, in a startup phase, a stronger coupling effect than after the startup phase.

Some embodiments according to the invention provide the possibility for the energy storage to be, for example, inductively or capacitively coupled to a feedback circuit, so that the voltage converter circuit may be excited to execute self-oscillating oscillations, whereby an operating frequency of the clocked supply of energy is determined.

Some embodiments according to the present invention apart from that offer the advantage that, with the help of a regulating circuit which is coupled to a control terminal of the second transistor, an operating frequency of the clocked supply of energy may be controlled depending on load.

Some embodiments according to the present invention further offer the advantage that a feedback circuit which is inductively coupled to the energy storage comprises a switchable, capacitive element which is implemented to cause a stronger coupling effect in a startup phase than after the startup phase.

Some embodiments according to the present invention offer the advantage of providing a self-oscillating voltage converter which may start the conversion of voltage at operating voltages below a turn-on voltage of a switching transistor for the voltage converter.

Embodiments of the present invention further offer the advantage that, when using a self-conducting junction field effect transistor (JFET) as a first switch and when using a metal oxide semiconductor field effect transistor (MOSFET) as a second switch, the conversion of a voltage in the startup phase already starts with a low input voltage by activating the self-conducting JFET and that, after the startup phase, by activating the MOSFET, the conversion may comprise a high efficiency.

The above and other elements, features, steps, characteristics and advantages of the present invention will become more apparent from the following detailed description of the preferred embodiments with reference to the attached drawings.

BRIEF DESCRIPTION OF THE DRAWINGS

In the following, embodiments according to the invention are explained in more detail with reference to the accompanying drawings, in which:

FIG. 10 shows a flowchart of a method for a clocked supply of energy to an energy storage according to an embodiment of the present invention.

DETAILED DESCRIPTION OF THE INVENTION

Figure 1:
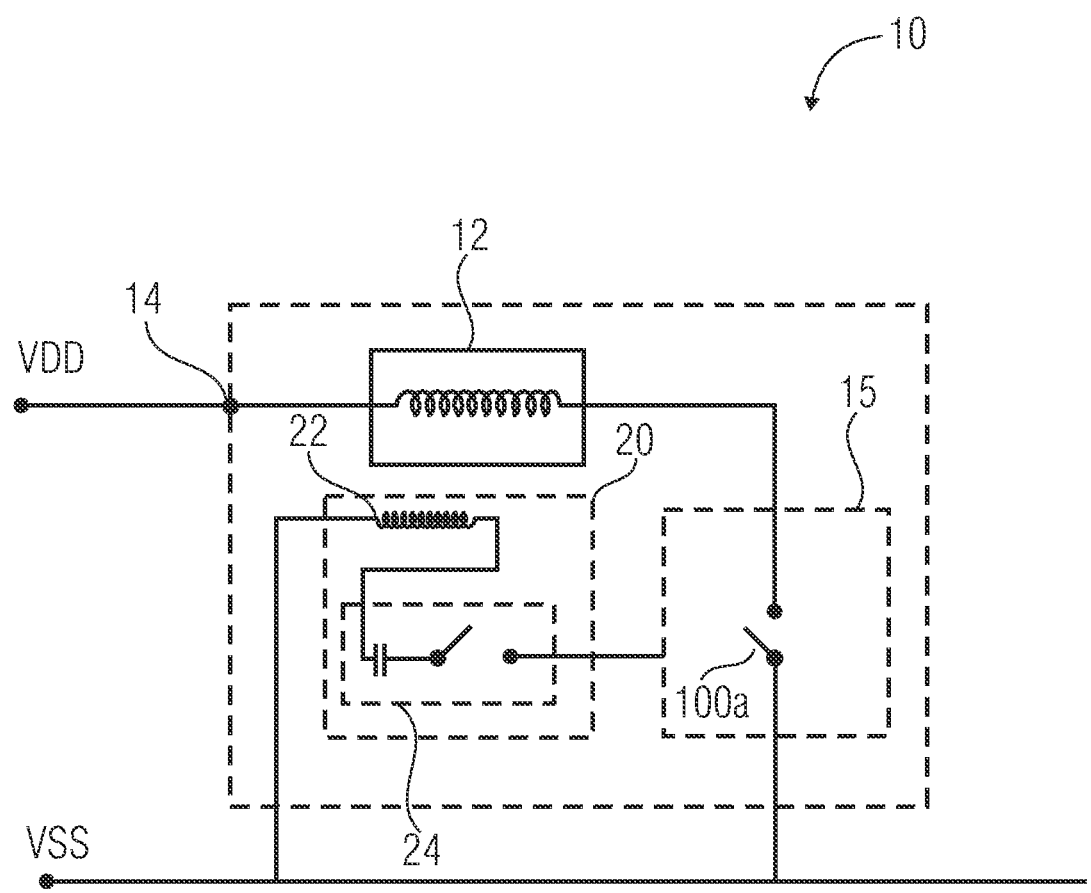
FIG. 1 shows a block diagram of a voltage converter circuit for supplying energy to an energy storage according to an embodiment of the present invention.

It should be noted regarding the following description of the embodiments of the present invention that, in the different figures and the entire description, for functionally identical and/or seemingly like or functionally like, equivalent elements or steps, for reasons of clarity, the same reference numerals will be used throughout.

In embodiments according to the present invention, voltage converter circuits may be realized for very low input voltages with a high efficiency. An advantage of these circuits are the small dimensions, so that in a simple way, for example, thermal generators may be used for gaining energy in a range of µW to mW.

FIG. 1 shows a block diagram of an embodiment of a voltage converter circuit 10 according to the present invention. The voltage converter circuit 10 for a clocked supply of energy to an energy storage 12, based on an input voltage VDD which is applied to an input 14 of the voltage converter circuit 10, comprises an energy storage 12 for storing energy and a switch arrangement 15 with a control terminal 100a. The switch arrangement 15 is coupled to the energy storage 12 to supply energy to the energy storage depending on a control signal applied to the control terminal in a switchable way. The voltage converter circuit 10 further comprises a feedback circuit 20 which is implemented to provide a feedback signal depending on a change of the energy stored in the energy storage 12 or depending on an amount of energy stored in the energy storage. The feedback circuit 20 further comprises a switchable coupling element 24 which is implemented to couple the feedback signal to the control terminal 100a of the switch arrangement. The switchable coupling element 24 is implemented to provide a stronger coupling effect in a startup phase of the voltage conversion than after the startup phase.

The embodiment of FIG. 1 is based on the finding that, in a startup phase, i.e. when the voltage converter builds up oscillation, a lower voltage may be provided at the input of the voltage converter than after the startup phase. With the help of the switchable coupling element of the feedback circuit, thus in the startup phase of voltage conversion a stronger feedback may be provided so that already with a low input voltage a control signal may be coupled to the control terminal of the switch arrangement and energy may be supplied to the energy storage in a switchable way. After the startup phase, at the input of the voltage converter circuit, a higher or a high voltage may be applied and the coupling effect of the switchable coupling element may be reduced, thus to prevent overriding the switch arrangement.

For example, the switchable coupling element 24 may comprise two capacities (24a, 24c) (FIG. 2) which are connected in parallel, wherein one of the capacities may be switched via the start assistance switch with the control terminal 24b'. In a startup phase for operating the voltage converter, then the capacity of the switchable coupling element 24 may be increased by closing a start assistance switch 24b to thus increase a capacitive coupling, and in an operating phase, after the startup phase, the start assistance switch may be opened and the capacitive coupling may thus be reduced.

Figure 2:
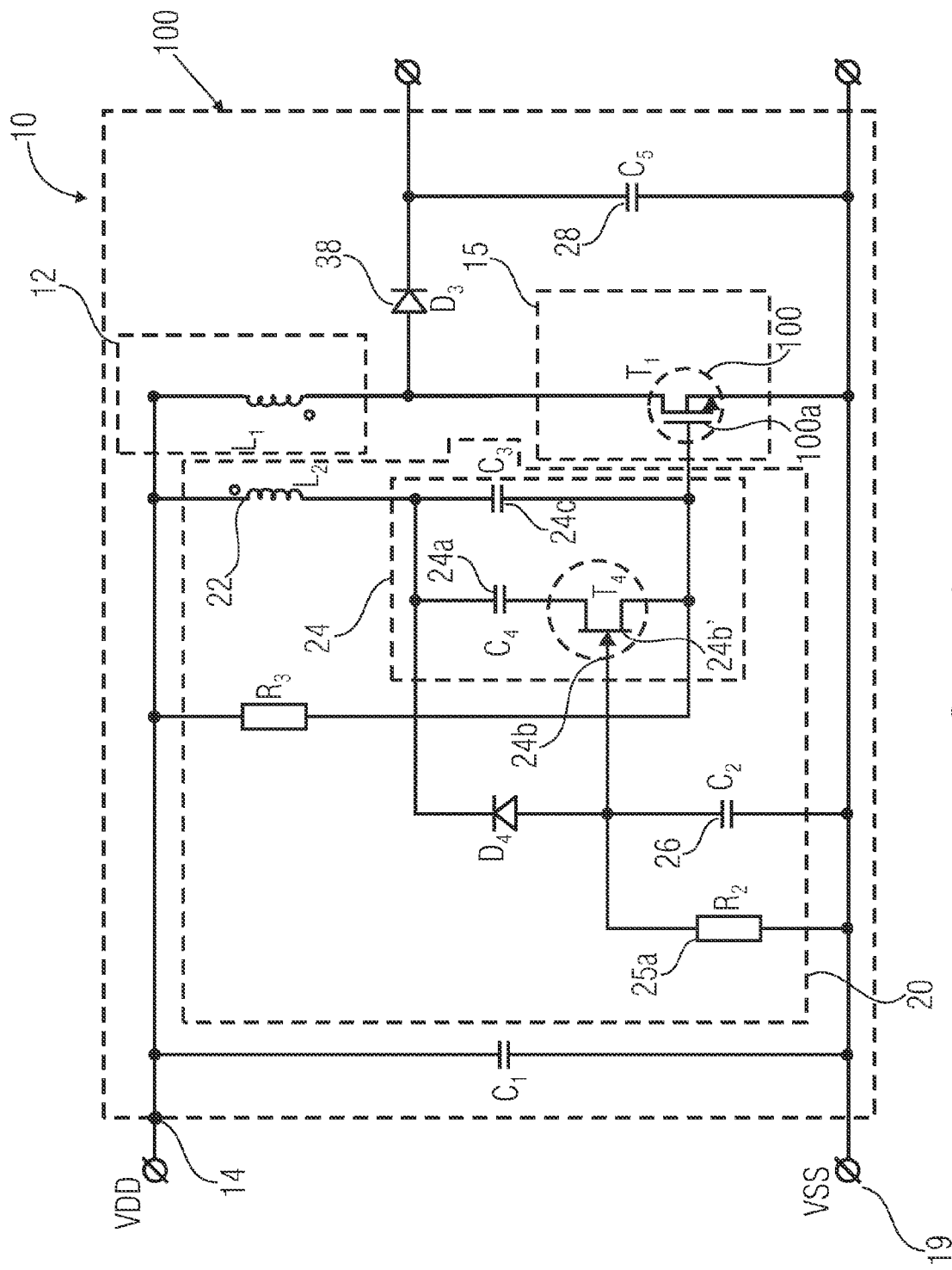
FIG. 2 shows a circuit diagram regarding a voltage converter circuit with a switchable capacitive coupling element, wherein the coupling elements serves as a start assistance according to an embodiment of the present invention.

FIG. 2 shows a circuit diagram for a voltage converter according to a further embodiment of the present invention. The voltage converter may be a self-oscillating voltage converter which comprises no active control circuit of the switching transistor or switch 100, respectively. The voltage converter circuit 10 with the input 14, to which an input voltage VDD may be applied, comprises an energy storage 12. To the input 14 of the voltage converter circuit an input voltage VDD may be applied which is given by the potential difference of the reference potential VSS and the supply potential applied to the input 14. Between the supply potential at the input 14 and the reference potential VSS 19, in this embodiment an input capacitor $C_1$, and/or 18, may be coupled.

The energy storage 12 may be implemented as an inductive element, for example as an (induction) coil. This induction coil 12 may be inductively coupled to an inductive element 22 of the feedback switch 20. The induction coil 12 and the inductive element 22 may, for example, be part of a transformer. A temporally variable current flow through the coil 12, or $L_1$, respectively, generates an induction voltage in the inductive element 22, or $L_2$, respectively. The inductive element 12 may be coupled to the input 14 and may provide, by the induced induction voltage, a higher voltage than an input voltage at a terminal which is connected to a switchable coupling element 24. The induced voltage may thus serve as the feedback signal. The feedback circuit 20 further comprises a switchable coupling element 24.

In this embodiment, the switchable coupling element which may serve as a start assistance for the voltage converter may include a switchable, capacitive coupling element having two capacitors $C_4$ and $C_3$ connected in parallel. The capacitor $C_4$ may be switched in with the help of the start assistance switch 24b, which is here implemented as an n-type JFET transistor. Its capacity thus effectively contributes to the overall capacity of the switchable capacitive coupling element 24, while it does not, or only in a reduced way contribute to the overall capacity and thus to the coupling after the startup phase by opening the switch 100 or blocking the JFET, respectively. Thus it may, for example, be achieved that a feedback from the energy storage 12 to the control terminal 100a of the switch 100 is stronger in the startup phase than after the end of the startup phase, and that also after the startup phase further a reduced feedback exists. By this, it may, for example, be achieved that the switch 100 is already active with a startup voltage applied to the input which is smaller than a turn-on voltage of the switch 100, to supply energy to the energy storage. The startup voltage, from which the voltage converter circuit starts to convert an input voltage applied at the input, may thus be smaller according to amount than a threshold and/or turn-on voltage of the switch and/or transistor 100. This is, however, not absolutely requested.

The switch arrangement 15 comprises a switch 100 which is implemented, for example, as an n-channel MOSFET. A control terminal 100a of the switch 100 is here connected to the switchable coupling element 24 or coupled to the energy storage 12 via the switchable coupling element 24, respectively. The control terminal 100a is controlled during the operation of the voltage converter such that energy is supplied to the energy storage 12 in a clocked way or in a switchable way, respectively, which is then, in a phase in which the switch 100 is open, transmitted to the output capacitor 38, or $C_5$, respectively, via the diode D3, or 29, respectively. The diode $D_3$, which is then poled in a reverse direction, prevents a "backflow" of the energy, e.g. charge, stored on the output capacitor $C_5$ during the phase in which the switch 100 is closed and a current is built up by the coil 12 from the supply potential to the reference potential VSS. By the changing current through the coil, a voltage is induced in the inductive element 22.

In this embodiment, the feedback circuit 20 further comprises a capacitive element 26, or $C_2$, respectively, and a resistive element 25a, or $R_2$, respectively. A first side of this resistance/capacity element (RC element of $C_2$ and $R_2$) is connected via a diode D4 to the switchable coupling element 24 and a terminal of the induction coil 22, or $L_2$, respectively. A second side of the resistance/capacity element is connected to the reference potential VSS. When the voltage converter circuit builds up oscillation, the capacitor $C_2$ is negatively charged by the voltage provided from the inductive element via the diode D4. The voltage building up at the capacitor $C_2$ may be so high after the startup phase, i.e. during the operation phase, that the start assistance switch 24b is permanently open or that in this embodiment the JFET 24b is permanently blocked, respectively. Via the resistive element R3, the input voltage is connected to the switchable coupling element 24.

With the help of the switchable coupling element 24, which provides, in a startup phase, a stronger coupling effect between the feedback signal and the control terminal than after the startup phase, the switch 100 may already be active from an input voltage VDD which is smaller than a turn-on voltage of the switch 100, in order to supply energy to the energy storage. The voltage converter may already start to convert the voltage applied to the input with a starting voltage which is applied to an input 14 with regard to the reference potential VSS and which is smaller than a turn-on or threshold voltage, respectively, for switching the switch 100.

In some embodiments, the switch arrangement 15 may comprise a switch 100 which is implemented to supply energy in a switchable way to the energy storage depending on a control signal applied to the control terminal 100a of the switch 100. The switch 100 may, for example, be a transistor, for example a field effect transistor or a bipolar transistor, and the control terminal 100a of the switch arrangement 15 may accordingly be a control terminal (gate terminal or base terminal) of the transistor. The switch may, for example, be a metal oxide semiconductor field effect transistor (MOSFET) or a junction field effect transistor (JFET).

In some embodiments, the energy storage 12 may be implemented as a coil for storing or temporarily storing magnetic field energy, and the feedback circuit 20 may comprise an inductive element 22, for example also a coil. The inductive element 22 may be magnetically coupled to the coil 12 so that by a change of the energy stored in the coil 22 a voltage is induced in the inductive element 22. This induced voltage may, according to embodiments, be coupled by a switchable capacitive element 24, which may be part of the feedback circuit 20, to the control terminal 100a of the switch 100. The switchable capacitive element may here be implemented to provide a stronger coupling effect between the inductive element 22 and the control terminal 100a in a startup phase than after the startup phase. In other words, the switchable coupling element may also serve as a startup assistance for starting up oscillations of the voltage converter 10. By the feedback circuit 20 with the switchable capacitive element, a starting of oscillation of the voltage converter or a starting of the voltage conversion may be achieved with a lower starting voltage than with a feedback circuit without the switchable capacitive element.

The switchable capacitive element 24 may comprise a start assistance switch 24b which is wired up such that the switchable capacitive element 24 provides a stronger coupling effect in the startup phase than after the startup phase. The start assistance switch 24b may, for example be a normally on transistor which is in a conductive state already with low voltages, according to amount. The start assistance switch 24b may further be, for example, a junction field effect transistor (JFET).

According to embodiments, the energy storage, as already mentioned above, may be implemented as a coil 12 which is inductively coupled to an inductive element 22 of the feedback circuit 20. By a change of the energy stored in the coil, a self-oscillating oscillation may be excited in the voltage converter circuit, which enables a clocked transmission of energy to an output side of the voltage converter.

The voltage converter circuit may be implemented such that the energy storage 12 is coupled to an output capacity 28 via a rectifier 38, for example a diode. On the output capacity 28, a charge transmitted from the energy storage may be stored so that, depending on the transmitted charge, an output voltage may be provided which may be higher than an input voltage VDD which is applied to the input 14 of the voltage converter circuit 10.

According to a further embodiment, the energy storage may be coupled to the feedback circuit 20 so that, depending on a change of the energy stored in the energy storage or depending on an amount of energy stored in the energy storage, a feedback signal results which excites the voltage converter circuit to execute self-oscillating oscillations. The feedback signal may be coupled to the control terminal of the switch 100 so that by this a control signal is provided to supply energy in a switchable or clocked way, respectively, to the energy storage.

According to embodiments, the start assistance switch 24b may be implemented as a junction field effect transistor whose control terminal 24b' is coupled to the energy storage 12 so that the start assistance switch 24b is active in the startup phase to cause a stronger coupling than after the startup phase. It is also possible for the start assistance switch 24b to be wired up such that a coupling effect of the switchable capacitive element 24 with regard to the control element 100a of the switch 100, which is implemented as a transistor, is periodically changed during the startup phase.

In embodiments, the voltage converter circuit 10 may further comprise a capacitive element 26 which is coupled to the switch 100 and which is implemented to build up a potential depending on a change of the energy in the energy storage 12 or the amount of the energy in the energy storage, which works towards switching off the start assistance switch. In other words, during the operation of the voltage converter, at a capacitor 26 which is integrated in the circuitry of the voltage converter and which is electrically connected to the start assistance switch 24b or the control terminal 24b' of the start assistance switch, respectively, a potential may be built up so that a voltage results at or is applied to the control terminal 24b', which leads to opening or switching off of the start assistance switch, respectively. If the start assistance switch is implemented as a transistor, thus the electric resistance between the source terminal and the drain terminal of the transistor is increased and a current flow between the two load path terminals (drain terminal and source terminal) is reduced or stopped—i.e. the transistor blocks.

In a further embodiment of the present invention, the above-described switch arrangement 15 may comprise a first switch 13 and a second switch 17 (see FIGS. 3, 4, 5) which are connected in parallel. The first switch 13 may comprise a smaller turn-on voltage according to amount than the second switch 17. A control terminal 13a of the first switch 13 may be wired up such that the first switch is active in a startup phase of the voltage converter circuit, i.e. is closed to supply energy to the energy storage. A control terminal 17a of the second switch 17 may be wired up such that the second switch is active after the startup phase to supply energy to the energy storage 12 in a clocked way. In this embodiment, the feedback circuit 20 further comprises a switchable coupling element 24 which is implemented to couple the feedback signal, for example from the inductive element 22 to the control terminal 17a of the second switch 17. The switchable coupling element 24 is implemented to provide a stronger coupling effect in a startup phase than after the startup phase.

The function of the voltage converter 10 which is illustrated in the embodiment of FIG. 2 may be described as follows. When applying an operating voltage to the voltage converter or DC/DC converter, the n-type JFET $T_4$, or 24b, is first of all conductive as its gate/source voltage is virtually zero or equal to zero. This causes a parallel connection of the capacitor $C_4$, or 24a, and the capacitor $C_3$, or 24c, which is smaller by orders of magnitude. In other words, a capacity of the switchable feedback capacitor $C_4$ may, for example, be at least 10 times greater than a capacity of the permanently effective feedback capacitor $C_3$. When the circuit starts oscillating, the capacitor $C_2$ is negatively charged via the diode $D_4$. This voltage becomes so great in a static operation that the JFET 24b remains blocked at any time in a static operation. By this, the capacitor $C_4$ becomes inoperable and only the capacitor $C_3$ is still active. $C_3$ virtually forms a voltage divider with the parasitic capacities at the gate terminal of the transistor $T_1$, or 100. By this, the capacity value of the capacitor $C_3$ may be optimized such that the switching edges at the transistor $T_1$ may be kept low. The resistor $R_2$, or 25a, causes the capacitor $C_2$, or 26, to be discharged again after switching off the voltage converter and the JFET $T_4$ to be conductive again at a restart of the converter 10.

According to embodiments, the two coils 12 and 22 of the transformer of the DC/DC converter may, for example, together comprise an ER9.5 core of the ferrite material N87. The turns ratio of the two coils $L_1$ and $L_2$ in this example is 1:8. As a start assistance switch 24b, or $T_4$, the JFET PMBF4393 of the company Philips may be used which comprises a pinch-off voltage between −3.0 V and −0.5 V according to its datasheet. The switching transistor $T_1$, or 100, may, for example, be the MOSFET NDS335N of the company Fairchild. The threshold voltage of this MOSFET, according to its datasheet, is approx. 0.7 V. The capacity values of the capacitors $C_3$ and $C_4$ may, for example, be 320 pF and 22 nF. With the use of these devices, the voltage converter may already start from 520 mV. If the circuit were, on the other hand, operated only using the capacitor $C_3$, i.e. without the help of the capacitor $C_4$, the converter would only start from a startup voltage of 680 mV.

Figure 3:
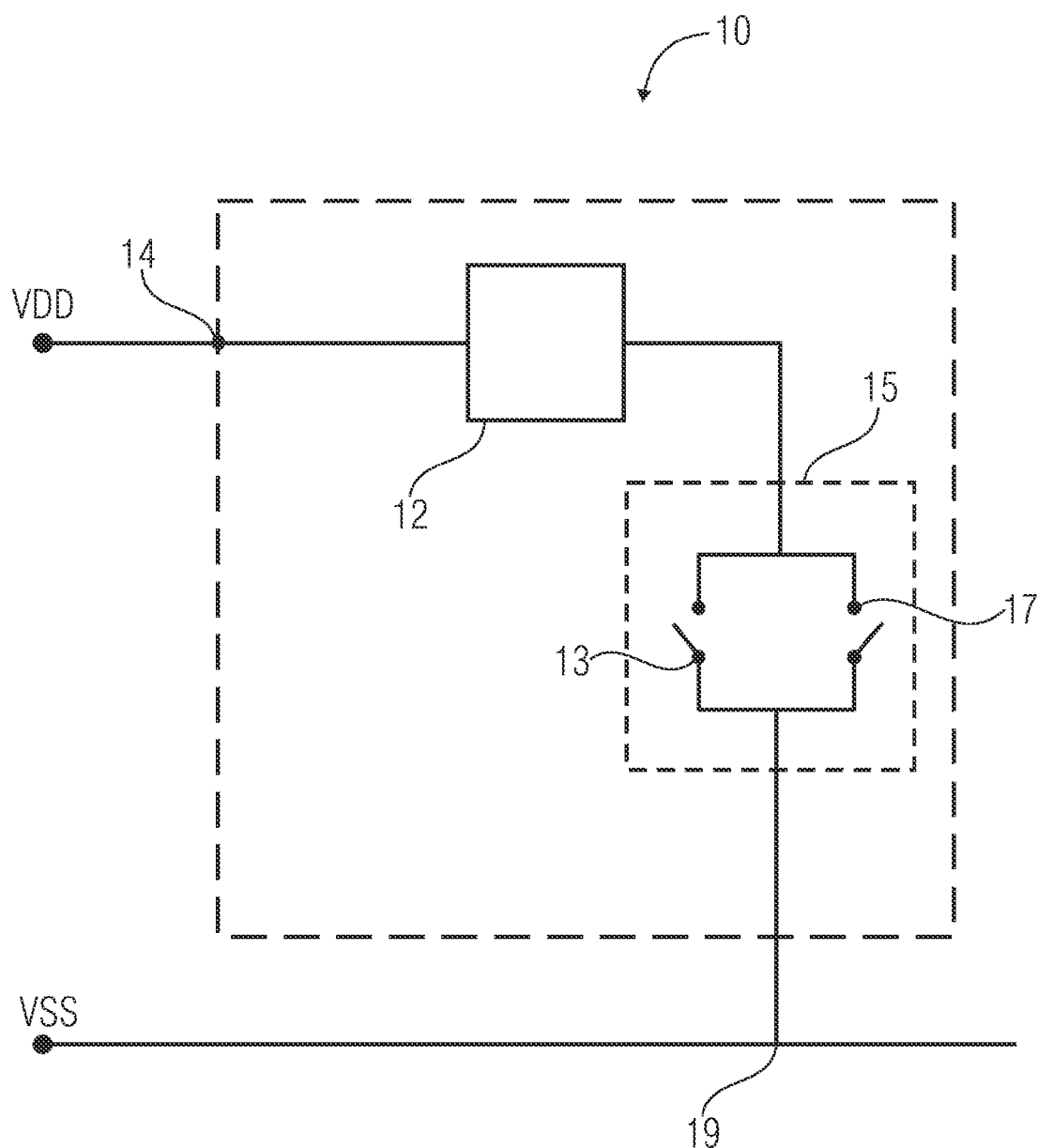
FIG. 3 shows a block diagram of a voltage converter circuit for a clocked supply of energy to an energy storage according to an embodiment of the present invention.

FIG. 3 shows a block diagram of a further embodiment of a voltage converter circuit 10 according to the present invention. The voltage converter circuit 10 for the clocked supply of energy to an energy storage based on an input voltage VDD which is applied to an input 14 of the voltage converter circuit 10 comprises an energy storage 12 for storing energy and a switch arrangement 15 coupled to the energy storage 12. The switch arrangement 15 comprises a first switch 13 and a second switch 17 which are connected in parallel and coupled to the energy storage. The first switch 13 comprises a smaller turn-on voltage according to amount than the second switch 17. A control terminal 13a of the first switch is here wired up such that the first switch is active in a startup phase of the voltage converter circuit to supply energy to the energy storage. A control terminal 17a of the second switch 17 is wired up such that the second switch is active after the startup phase to supply energy in a clocked way to the energy storage.

The energy storage 12 may, for example, be an inductive element, that is, e.g., an induction coil. When applying an input voltage VDD to the input 14 of the voltage converter circuit 10, then, for example, in a startup phase the first switch 13 may be active, i.e. closed, so that a temporally changed current, i.e. a temporally increasing current for example, flows through the coil from the input 14 to a reference potential VSS, and thus energy stored in a magnetic field of the coil increases. After a startup phase, the control terminal 17a of the second switch 17 may then be controlled due to a corresponding wiring such that the second switch 17 is closed and opened in a clocked way. In the phases in which the second switch 17 is closed, also by a changeable current flow through the coil 12, magnetic field energy may be supplied to this coil 12. The current may flow, with a closed first and/or second switch, to the reference potential VSS, which may, for example, be a mass potential.

Another embodiment may, for example, be a voltage converter circuit with a capacitive energy storage 12. This voltage converter circuit may then, for example, be integrated into a charge pump. Embodiments of the present invention may, for example, be an inductive converter circuit or a capacitive voltage converter circuit. If the voltage converter circuit contains a transformer having coupled coils, some embodiments of the present invention may also be a DC/DC converter.

Figure 4:
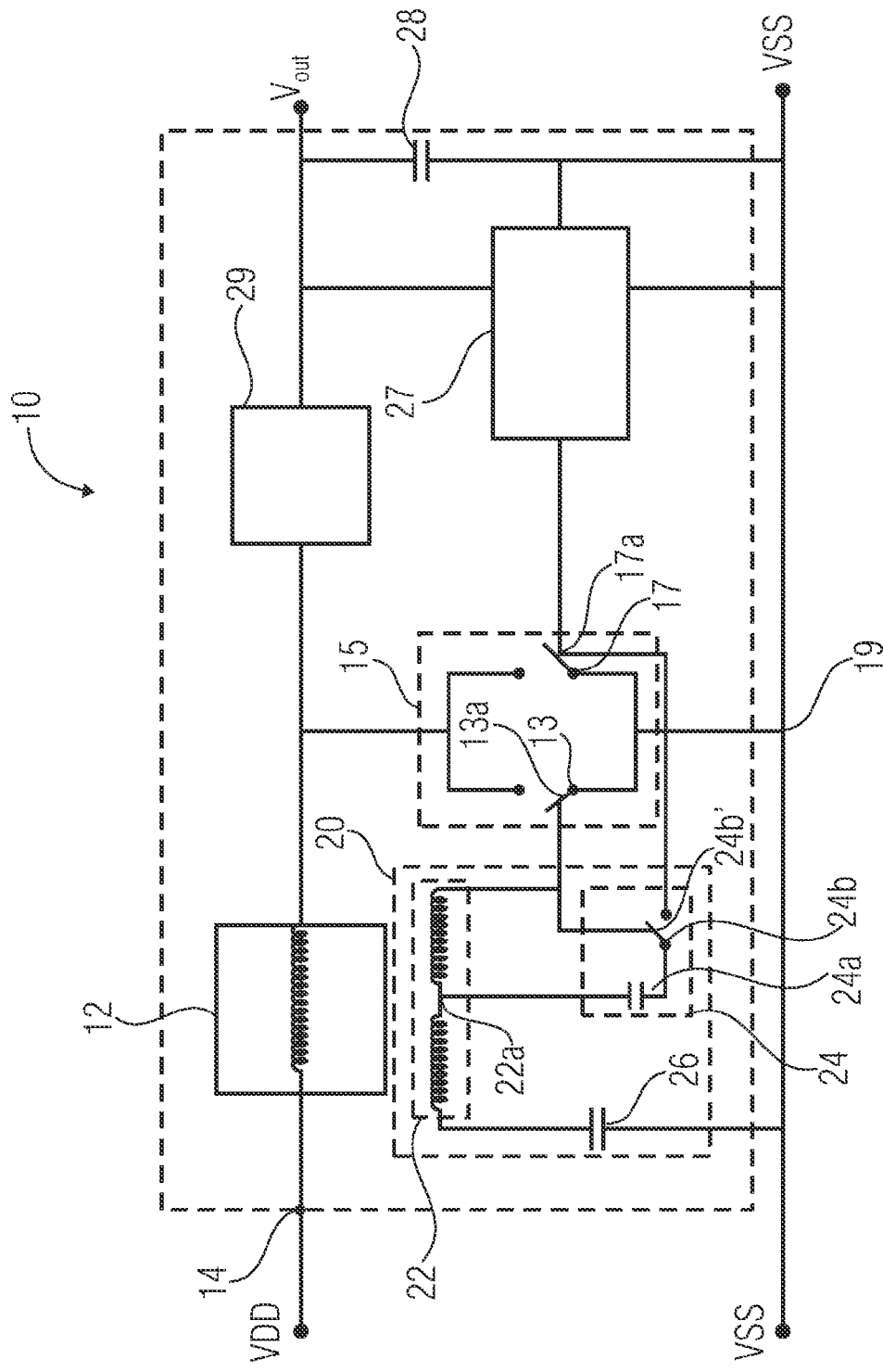
FIG. 4 shows a further block diagram of a voltage converter circuit having a feedback circuit, a regulating circuit, an output capacity and a controllable rectifier between the energy storage and the output capacity, according to a further embodiment of the present invention.

FIG. 4 shows a further block diagram of an embodiment of a voltage converter circuit 10. The voltage converter circuit 10 comprises an energy storage 12 which may be implemented as an inductive element, e.g. a first coil or first induction coil, respectively. This first induction coil 12 may be inductively coupled to an inductive element 22 of a feedback circuit 20. I.e., by a change of the energy stored in the induction coil, i.e. when a temporally variable current flows through the induction coil 12, in the inductive element 22 a voltage is induced. The feedback circuit 20 may further comprise a switchable coupling element 24, e.g. a switchable capacitive element, which is implemented to provide, in a startup phase, a stronger coupling effect between the inductive element 22 and the control terminal 17a of the second switch 17, as compared to after the startup phase. The feedback circuit 20 may be implemented to couple a voltage to the control terminal 17a of the second switch 17 via the capacitive element 24, so that the second switch 17 is active and/or is controlled after the startup phase to supply energy in a clocked way to the energy storage 12, i.e. the induction coil. I.e., by applying a voltage, coupled in via the capacitive element 24, to the control terminal 17a of the second switch, the second switch may, for example, be closed, so that a temporally more variable current flow takes place through the coil 12 to the reference potential VSS, whereby magnetic energy is supplied to the coil 12.

The switchable coupling element, i.e., e.g., the switchable capacitive element 24 of the feedback switch 20 may, for example, be a capacitor 24a, which is connected in series with a third switch 24b. The control terminal of the third switch 24b may be wired up such that the switch is closed during the startup phase to thus achieve a stronger coupling via the capacitor 24a to the control terminal 17a of the second switch 17 than after a startup phase in which the third switch 24b is opened. The capacitor 24a here separates the direct voltage portion of the induced voltage from the control terminal 17a of the second switch 17.

In a further embodiment, the feedback circuit 20 may be implemented such that a terminal of the inductive element 22 is connected to a further capacitive element 26 of the feedback circuit 20. The capacitive element 26 may be implemented to build up a potential with respect to the reference potential VSS in the startup phase at the inductive element 22 by an induced voltage, so that the control terminal 13a of the first switch 13 which is also coupled to the inductive element 22 is controlled such that in the startup phase supplying energy to the induction coil 12 is reduced by a periodic partial opening and closing of the first switch 13 until after the startup phase a potential is applied to the capacitive element 26, so that the supply of energy to the energy storage 12 is ended by opening the first switch 13.

The first, the second and the third switch may, for example, be transistors. The first switch 13 may, for example, be a junction field effect transistor (JFET), i.e., for example, a self-conducting (normally on) transistor which is already switched on from a control voltage of 0 V, i.e. is electrically conductive. The second switch may, for example, be a metal oxide semiconductor field effect transistor (MOSFET), for example an NMOS transistor or also a PMOS transistor. The third switch 24b may again be a normally on JFET transistor.

The first transistor 13 may thus be a normally on transistor which is already current-carrying at a control voltage or gate voltage of 0 V, and the second switch 17 may be, for example, an MOSFET with a turn-on voltage which is higher than the turn-on or threshold voltage of the first transistor 13. In the startup phase of the voltage converter circuit 10, now initially only the first transistor, for example the JFET 13, may be active, as a voltage applied to the input 14 may be low. As the JFET is a normally on device, a current may flow already from an input voltage of just over 0 V via the inductivity 12, i.e. the energy storage. Thus a current increases across the induction coil 12 at a startup of the converter, so that in the induction coil 12 a temporally variable current flows, and thus a voltage is induced in the inductive element 22. By the induced voltage, in this embodiment a negative current may be induced in the inductive element 22, which may also be implemented as a coil, so that the capacitive element 26 is charged with a low negative voltage. As at the control terminal 13a of the JFET transistor 13 a PN transition to the reference potential VSS is given, in the course of time a low negative voltage may form at the capacitive element 26 due to the diode rectification effect. At the time when an input voltage VDD becomes constant, the current flow in the induction coil 12 becomes constant, or when a rate of change of the current decreases, no voltage or only a very low voltage is induced in the inductive element 22. As the control terminal, i.e. the gate terminal of the JFET transistor 13, is coupled to the capacitive element 26, which lies on a small negative potential, the current flow through the JFET is reduced, i.e. the switch 13 is opened. By this, the constant current flow through the induction coil 12 may be reduced. Thus, again a voltage may be induced into the feedback circuit 20 via the coupled inductive element 22. This switching cycle may now be repeated with a constant input voltage. For the current which flows through the induction coil 12, then an exponential connection results, with a time constant which depends among others on a serial equivalent resistance of the energy source providing the input voltage 14. This time constant may, for example, be in the range of microseconds, which is why a high negative voltage may be induced in the inductive element 22 until the current flow reaches is maximum value through the induction coil 12. As the control terminal 13a, i.e. the gate terminal of the junction FETS 13, is connected or coupled to the capacitive element 26, respectively, the junction FET is then closed again, which leads to a reduction of the current through the induction coil 12. The cycle may then be repeated.

If the voltage across the capacitive element 26 falls below a certain negative value, i.e. is, for example, smaller than a turn-on voltage of the first switch or the first transistor 13, respectively, the first transistor 13 is not switched on any more and the second switch 17 or the MOSFET, respectively, becomes the switching transistor. After the startup phase, the second switch or the MOSFET transistor 17, respectively, takes over the clocked supply of energy to the energy storage 12.

According to embodiments of the present invention, the energy storage 12 may be coupled with the feedback circuit 20, so that, depending on a change of the energy stored in the energy storage 12, a self-oscillating oscillation of the voltage converter circuit may be excited. The energy storage may, for example, be an induction coil which is inductively coupled to the feedback circuit, so that, depending on a change of the current flowing in the induction coil, a self-oscillating oscillation of the voltage converter circuit is excited. The DC/DC voltage converter circuit described here is, in embodiments, a self-oscillating converter regarding its basic concept, i.e. the switches or switching transistors are not controlled via an active circuit, but only via coupled coils of a transformer.

According to one embodiment of the present invention, the energy storage 12 may be coupled with a feedback circuit 20 such that, depending on a change of the energy stored in the energy storage or depending on an amount of the energy stored in the energy storage, a feedback signal results which excites the voltage converter circuit to execute self-oscillating oscillations. Apart from that, the feedback circuit 20 may comprise a resistive element 25a and a capacitive element 26, so that the frequency of the self-oscillating oscillations for a clocked supply of energy to the energy storage among others depends on an RC time constant of the feedback circuit 20.

The voltage converter circuit for the clocked supply of energy to an energy storage may apart from that comprise a locked loop 27 which is implemented to control the frequency or a duty cycle of the supply of energy to the energy storage after the startup phase. In this respect, the locked loop 27 may be coupled to a control terminal 17a of the second switch 17.

According to a further embodiment, the voltage converter circuit may be implemented such that the energy storage 12 is coupled to an output capacity 28 via a rectifying element, i.e., e.g., a diode. At the output capacity 28, depending on a charge transmitted by the energy storage 12, an output voltage $V_{out}$ may then be provided. This output voltage may be higher in some embodiments than an input voltage which is applied to the input of the voltage converter circuit. The rectifier element 29 may be a switched rectifier element, i.e., for example, a diode which is connected in parallel to a switch. The switch may, for example, be a transistor whose control terminal is wired up in a predetermined way.

According to some embodiments, the transmission of charges to the output capacity 28 may be executed such that after the startup phase, by closing the second switch 17, energy is supplied to the energy storage 12 in a clocked way. In a way opposite to the clocked way, charges may be transmitted from the energy storage to the output capacity 28. I.e., after the startup phase, during the phase in which the switch 17 is closed, energy is temporarily stored in the energy storage 12. In the (clocked) phases, in which the switch 17 is open, this temporarily stored energy or charge is transmitted via the rectifying element 29 to the output capacity 28. The charges are thus "pumped" to the output capacity in a clocked way opposite to the clocked way, i.e., for example, when the switch 17 is open. There, an output voltage $V_{out}$ may form at the output capacity 28 which may be different according to amount from the input voltage with respect to its voltage value.

The control of this clocked supply of energy into the energy storage 12 and, in the opposite phases, of transmitting this temporarily stored energy onto the output capacity 28, may be supported and/or enabled or caused by the locked loop 27. The output capacity 28 acts as a second energy storage at the output of the voltage converter circuit, so that an output voltage is available which is different from the input voltage.

The locked loop 27 may be coupled to a control terminal of the second switch 17 to control, depending on a load at the output capacity 28, a frequency for the clocked supply of energy to the energy storage 12 and for the clocked transmission of charges from the energy storage onto the output capacity 28 which is opposite to the clocked supply. For example, in one embodiment, the locked loop may be implemented such that the frequency for the clocked supply of energy and for the transmission of charges onto the output capacity 28 is decreased, the higher the load at the output capacity. I.e., depending on a load coupled to the output of the voltage converter circuit, i.e., for example, to the output capacity 28, the frequency of the voltage conversion may be changed.

Figure 5:
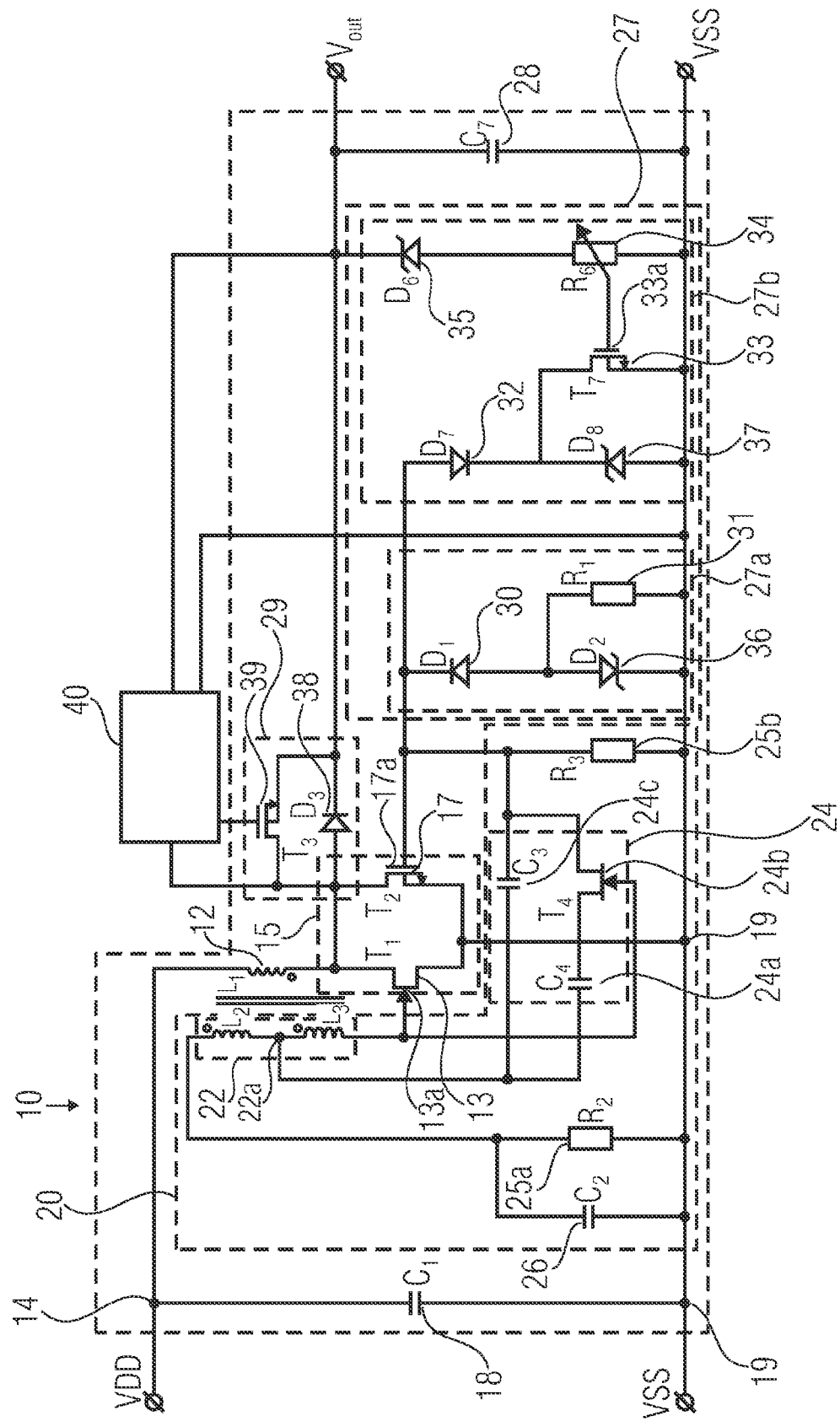
FIG. 5 shows a circuit diagram of a voltage converter circuit for a clocked supply of energy to an energy storage according to a further embodiment of the present invention.

FIG. 5 shows the circuit diagram of a voltage converter circuit according to a further embodiment of the present invention. The voltage converter circuit 10 for a clocked supply of energy to an energy storage based on an input voltage in this embodiment comprises an energy storage 12 which is implemented as an inductive element, i.e., for example, as a first coil. At the input of the voltage converter circuit 14 an input voltage VDD is applied which is connected to the energy storage 12. Between the input voltage VDD and the reference potential VSS 19, in this embodiment, an input capacitor $C_1$ 18 may be coupled. The energy storage 12 is, in this embodiment, connected to the switch arrangement 15. The switch arrangement 15, in this embodiment, comprises a normally on first JFET transistor $T_1$, or 13. Apart from that, the switch arrangement 15 comprises a second MOSFET transistor $T_2$, or 17, here, for example, an NMOS transistor, connected in parallel to the JFET transistor $T_1$. The transistors $T_1$ and $T_2$ connected in parallel are coupled to the energy storage 12 and coupled to a reference potential VSS 19. The normally on JFET transistor $T_1$, or 13, functioning as the first switch, comprises a smaller turn-on voltage according to amount than the NMOS transistor $T_2$, or 17. For example, the JFET transistor 13 may comprise a turn-on voltage, or a turn-on threshold voltage, of 0 V.

The energy storage 12 in the illustrated embodiment is respectively magnetically or inductively coupled to the feedback circuit with an inductive element 22. In this embodiment, the inductive element 22 may consist of two induction coils $L_3$ and $L_2$. The inductive element 22 may be connected to a switchable capacitive element 24 via a tap 22a connected between the second induction coil $L_2$ and the third induction coil $L_3$. In this embodiment, the switchable capacitive element 24 consists of two capacitors C3, or 24c, and C4, or 24a, connected in parallel. The branch with the capacitor 24, or $C_4$, comprises a JFET transistor 24b, or $T_4$, so that, depending on the wiring of the capacitor 24b, the overall capacity of the capacitive element 24 may be increased. The JFET $T_4$ 24b may then be wired such that in a startup phase of the voltage converter circuit the overall capacity of the capacitive element 24 is increased. In this embodiment, the capacitive element 24 is thus, on the one hand, connected to the tap 22a of the inductive element 22 and, on the other hand, to the control terminal 17a of the NMOS transistor $T_2$. The feedback circuit 20 further comprises a capacitive element 26, or $C_2$, and a resistive element 25a, or $R_3$. This resistance capacity member (RC member of $C_2$ and $R_3$) is connected to a terminal of the second induction coil $L_2$ and the reference potential VSS.

Further, a further terminal of the third induction coil $L_3$ of the inductive element 22 is connected to the control terminals 13a of the JFET 13 and to the control terminal of the JFET 24b of the capacitive element 24.

The voltage converter circuit 10 described in this embodiment may, for example, be a DC/DC converter which is a self-oscillating converter regarding its basic concept. I.e., the switching transistors of the voltage converter circuit do not have to be controlled via an active circuit but are only controlled via coupled coils of a transformer, so that a self-oscillating oscillation of the DC/DC converter results.

When applying an input voltage VDD to an input 14, in a startup phase initially the JFET $T_1$ 13 operates. As the JFET is a normally on device, already from an input voltage of over 0 V in the inductivity $L_1$, i.e. the energy storage 12 of the transformer, a current builds up. As the input voltage increases at the startup of the converter, also the current through the induction coil $L_1$ increases, so that in the second induction coil $L_2$ and the third induction coil $L_3$ a voltage is induced and the converter starts to oscillate. As soon as the voltage is high enough at the tap 22a between the second induction coil $L_2$ and the third induction coil $L_3$ of the transformer, the MOSFET transistor $T_2$, or 17, switches on and takes over the current conduction in the voltage converter.

I.e., in a startup phase initially the JFET 13 is active, i.e. a current flows through the first coil $L_1$ via the JFET to the reference potential VSS 19. By this, a voltage is coupled into the feedback circuit 20 via the inductive element 22. In this startup phase, by the connection of the inductive element 22 to the JFET 24b of the capacitive element 24, the capacitor 24a may be connected to the capacity of the capacitor 24c, so that in the startup phase a stronger coupling effect with regard to the control terminal 17a of the second transistor 17 may be caused than after a startup phase in which the JFET 24b is switched off, so that the overall capacity of the capacitive element 24 is reduced.

Due to the increase of the current through the first coil 12, in this embodiment, a negative current is induced into the inductive element 22, so that at the capacitive element 26 a small negative voltage builds up due to the PN transition at the gate terminal 13a of the junction FET 13 which is connected to the reference potential VSS at the source side. The reference potential VSS may, for example, be a ground or earthing potential. The current in the primary coil $L_1$, or 12, is then, for example, constant when the input voltage is applied in a stable or constant way. As a consequence, the current flow through the primary coil 12, or $L_1$, is also constant and no voltage is induced in the secondary coils $L_2$ and $L_3$. As the control terminal 13a of the JFET 13 is connected to the capacitive element 26, or $C_2$, via the inductive element 22, and as the same comprises a negative voltage, as was described above, the current through the JFET is reduced and thus also the current flow through the first coil 12. By the change of the current flow through the first coil 12, now again a voltage is coupled via the inductive element 22 into the feedback circuit 20. This switching cycle may now be repeated with a stable input voltage VDD, which may mean that an exponential performance may occur for the current flow through the first coil 12 with a time constant τ which may correspond to the inductivity of the first coil 12 divided by the resistive value of the JFET 13 and the equivalent resistance of the source of the input voltage for the voltage converter circuit 10. τ may be in a range of microseconds, which is why a high negative voltage may be induced in the inductive element 22, as long as the current through the first coil 12 reaches its maximum value. At this point, the control terminal 13a of the JFET 13 is coupled to the capacitive element 26 and the JFET 13 may be switched off. This causes the current flow through the first coil 12 to decrease until the current flow, for example, falls to zero again. Then, the cycle may begin again. If the voltage via the capacitive element 26 is smaller than the turn-on threshold voltage of the JFET, the JFET is not switched on any more and the second transistor 17, for example the NMOS $T_2$ becomes the switching transistor via which the main current flows. The capacitive element 26 may be charged more strongly negative and an output capacity 28 may be charged via the diode $D_3$.

Depending on a change of the energy stored in the induction coil 12, the voltage converter may be excited to execute self-oscillating oscillations.

Via the capacitive element 24, a voltage may be transmitted to the control terminal 17a of the MOSFET transistor 17, so that the same takes over current conduction when it reaches its turn-on voltage. As soon as the voltage at the tap between the induction coil $L_2$ and the third induction coil $L_3$ of the coupled coils, i.e. at the tap of the transformer, is great enough, the MOSFET $T_2$ switches through and takes over current conduction. Here, the capacitive element $C_2$ is negatively charged, so that in the stationary state, i.e. after the startup phase, at the same a constant negative voltage is applied and the JFET $T_1$ is switched off. The capacitor 24c and the capacitor 24a separate the direct voltage portion at the tap 22a from the control and/or gate terminal of the MOSFET $T_2$. An operating frequency of the voltage converter circuit is then mainly determined, after the startup phase, by the capacitor $C_3$, or 24c, and the resistive element 25b, or $R_3$. In embodiments of the present invention, the operating frequency may further be influenced by a locked loop 27, as is illustrated in the following.

The locked loop 27 may be implemented to control the frequency of the clocked conversion of an input voltage into an output voltage. In this respect, the locked loop 27 may be coupled to the control and/or gate terminal 17a of the MOSFET transistor 17. I.e., the frequency of supplying energy to the first induction coil 12 and transmitting energy and/or charge to an output capacity 28 of the voltage converter 10 may be controlled by the locked loop 27. The locked loop 27 is in this embodiment implemented such that, depending on a load at the output capacity 27, a frequency for the clocked coupling and for the transmission of charge from the first coil to the output capacitor 28 is controlled. The gate terminal 17a may in this respect be connected to a branch for a negative voltage limitation 27a and a branch for a positive voltage limitation 27b. The branch for the negative voltage limitation 27a may comprise a diode $D_1$, or 30, which is connected in series with a resistive element 31, or $R_1$, against the reference potential VSS. In parallel to this, the branch for a positive voltage limitation 27b may be arranged. This branch comprises a diode 32 which is connected in series with a transistor 33 against the reference potential. A control terminal and/or a control gate 33a of the transistor 33 $T_7$ may be controlled via a variable resistor 34 $R_6$, i.e., for example, a potentiometer, which is connected in parallel to the output capacity 28 via a Zener diode 35. By the branch for the positive voltage limitation and the branch for the negative voltage limitation, thus a gate voltage may be set and/or limited at the MOSFET transistor $T_2$. Depending on a load at the output and/or depending on a desired output voltage, the resistance of the potentiometer 34 and/or a voltage divider effect of the potentiometer 34 and thus the gate voltage at the transistor 33 may be changed. Thus, depending on a load at the output of the DC/DC converter, the gate voltage at the control terminal 33a of the transistor 33 and the control voltage at the second transistor and/or the MOSFET 17 may be set. By setting a channel resistance of the MOSFET 17, in some embodiments, a time constant of a gate control signal of the MOSFET $T_2$ may be set. By this, thus the frequency or a duty cycle of opening and closing the transistor 17, and thus of the clocked supply of energy and/or transmission of charges to the output capacity 28, may be set.

The locked loop 27 may thus comprise a diode $D_7$, a transistor $T_7$, a Zener diode $D_6$ and a voltage divider $R_6$. Using this locked loop, an on time of the switching transistor $T_2$ may be controlled. Thus, also the operating frequency may change with different loads. For example, the operating frequency may be lower, the higher the load.

The Zener diodes 36 and 37 are protection diodes which, for example, prevent in the case of an error, that the MOSFET $T_2$, or 17, receives inadmissibly high voltages at its control and/or gate terminal. The resistor 31, or $R_1$, serves as an additional start assistance for the converter.

Between the first induction coil 12 and the output capacity 28 further a switchable rectifier 29 may be arranged. The switchable rectifier 29 may comprise a diode 38 which is arranged in parallel to a transistor $T_3$, or 39, which may be wired up and/or is controlled via a further regulating circuit 40.

To optimize the efficiency of the circuit, in parallel to the diode $D_3$, or 38, of the switchable rectifier 29 a transistor 39 is connected which takes over current conduction when normally the diode would be conducting. This may, for example, be realized via a control circuit 40.

The controllable transistor 39 may, for example, be a PMOS transistor which comprises a sufficient dead time, i.e. a sufficient time in which it is open, so that no overlap of the PMOS transistor $T_3$, or 39, and the second MOSFET $T_2$ can occur.

In some embodiments, a high efficiency of the voltage converter circuit may be achieved by a suitable implementation of the transformer, i.e. of the coupled coils 12 and 22. The secondary side ($L_2$ and $L_3$) may comprise a tap 22a to optimally control the MOSFET transistor $T_2$, i.e. to minimize switching losses and still guarantee low starting voltages. The inductivity of the winding of the induction coil 12, or $L_1$, is selected to be as high as possible in some embodiments, so that an idle current of the converter may be kept low as compared to the maximum input current. To prevent high winding numbers and thus high ohmic and/or resistive losses, core materials may be used which have a high absolute magnetic permeability μ. The absolute magnetic permeability μ is the product of the magnetic field constant $μ_0$ and the relative magnetic permeability $μ_r (μ=μ_0 × μ_r)$. The absolute magnetic permeability may in some embodiments be higher than $6×10^{-5}$ H/m, for example higher than $6.28×10^{-5}$ H/m, which corresponds to a relative magnetic permeability $μ_r$ of 50. It is noted in some embodiments, however, that the saturation of the magnetization of the core is not exceeded. This mainly depends on the output power and finally on the maximum input current of the converter.

According to embodiments of the present invention, the above-described circuit for a DC/DC up-converter may exclusively be set up from discrete components. To enable a small dimension of the voltage converter circuit, all corresponding components may be available as surface mounted devices (SMD). For the transformer, i.e. the coils for the inductive coupling, for example an ER9.5 core of the ferrite material N87 may be used, which has small dimensions in proportion to the complete circuit. In order for the converter, i.e. the voltage converter circuit, to start with low input voltages of, for example, 60 mV, on the one hand the proportion of windings and/or turns of the first induction coil $L_1$, or 12, to the second induction coil $L_2$ and the third induction coil $L_3$ is to be chosen to be 1:8.5. L1:L2=L1:3=1:8.5 may, therefore, apply. The proportion of windings and/or turns may, however, also be, for example, between 1:4 and 1:25, depending on the turn-on voltage of the JFET $T_1$ and/or the transistor $T_3$. Apart from that, the JFET $T_1$ has a low pinch-off voltage of approx. 1.2 V according to amount. It is to be noted here, that the maximum gate/source voltage is dimensioned sufficiently high. In one embodiment, for example, the JFET PMBF4393 of the company Philips may be used. According to details in its datasheet, this has a pinch-off voltage between −3.0 V and −0.5 V and a maximum admissible gate/source voltage of 40 V. In some embodiments, the MOSFET BSH105 of the company Philips may be used as a switching transistor. The threshold voltage of this switching transistor is approx. 0.6 V. If the indicated switching transistors are used, it is sensible in some embodiments to dimension the second induction coil $L_2$ and the third induction coil $L_3$ to be of exactly the same size.

The voltage converter circuit 10 in FIG. 5 may in one further embodiment comprise a protection circuit which is coupled to the control terminal 17a of the second switch 17 to protect the control terminal of the second switch against overvoltage. The protection circuit may be two opposingly coupled and/or poled Zener diodes 36 and 37 which are, for example, switched in the illustrated way.

In embodiments of the present invention, the control terminal 17a of the second switch 17 may be coupled to a regulating circuit or locked loop 27, wherein the locked loop is implemented to control the frequency of the clocked supply of energy to the energy storage and a transmission of a load or charge from the energy storage to an output capacity 28 coupled to the energy storage. At the output capacity 28, an output voltage $V_{out}$ is then available. The locked loop 27 may in this respect comprise a positive and a negative current limitation and/or voltage limitation, wherein the voltage limitation, depending on a load or depending on an output voltage, may change the positive and/or the negative current limitation and/or voltage limitation so that the turn-on voltage of the second switch 17 is fallen short of or exceeded. In other words, depending on the load, the second switch 17 may be switched on and off.

The switch arrangement 15 with the first and second switches connected in parallel may be implemented such that the switch arrangement, in the startup phase of the voltage conversion and/or the voltage converter circuit, comprises a turn-on voltage between 0 V and 100 mV and is active after the startup phase via the second switch, so that this current path comprises a lower resistance than a current path via the first switch $T_1$. In embodiments of the present invention, the first switch may be a normally on transistor and the second switch may be a normally off transistor. For example, the first switch may be a JFET and the second switch an MOSFET. For example, the first switch 13 may be an N-channel FET of the depletion type, while the second switch 17 is an N-channel FET of the enhancement type. The first switch 17 may, for example, be an N-channel MOSFET with a smaller turn-on voltage and/or threshold voltage, according to amount, while the second switch comprises an N-channel MOSFET with a greater threshold voltage according to amount. It is also possible that, in some embodiments, transistors with an accordingly opposite doping are used. Different turn-on voltages may, for example, be achieved by different doping profiles, by gate oxides of different thicknesses or by other design parameters of the field effect transistors (FET).

In another embodiment of the present invention, the voltage converter circuit may further comprise a feedback circuit 20 which is implemented, depending on a change of the energy stored in the energy storage 12 or depending on an amount of energy stored in the energy storage, to provide a feedback signal. The feedback circuit 20 may comprise a switchable coupling element 24 which is implemented to couple the feedback signal to the control terminal 17a of the second switch 17, the switchable coupling element 24 being implemented to provide a stronger coupling effect in a startup phase than after the start-up phase.

According to a further embodiment of the present invention, the switch arrangement 15 may be implemented such that in a startup phase the first coil 12 may be coupled via the first switch and/or via the first transistor 13 to the reference potential VSS, so that a current flow through the first coil 12 may take place and a voltage may be induced into the feedback circuit 20. After the startup phase, i.e. when, for example, the first switch 13 is permanently open, or also during the startup phase, by closing the second switch 17 a current flow through the coil may be generated and/or enabled, so that a voltage may be induced into the feedback circuit 20.

The voltage converter circuit may be implemented as a voltage converter which provides at its output an output voltage $V_{out}$. The voltage converter may comprise an output capacitor for an intermediate storage of charge, i.e. energy. The voltage converter may thus be thus be implemented such that the second switch 17, after the startup phase, enables a clocked coupling of the coil to the reference potential, whereby a current flows through the coil which supplies magnetic energy to the coil, which is then, in a phase oppositely clocked to the clocked coupling transmitted in the form of charges from the coil 12 to the output capacitor 28. In this respect, between the coil 12 and the output capacitor 28 a rectifying element may be coupled, for example a diode or a switchable, rectifying element 29. The output capacitor 28 may be loaded and/or charged via the switchable, rectifying element 29.

The feedback circuit 20 may be implemented such that the capacitive element 26, or $C_2$, is used to switch off the first switch and/or the junction FET. I.e., if a voltage across the capacitive element 26 is lower than a turn-on and/or threshold voltage of the first switch $T_1$ and/or the first junction FET, the same is permanently switched off and the second transistor $T_2$ which may, for example, be an NMOS transistor becomes the active switching transistor. The capacitive element 26 may further be charged negatively.

Figure 6:
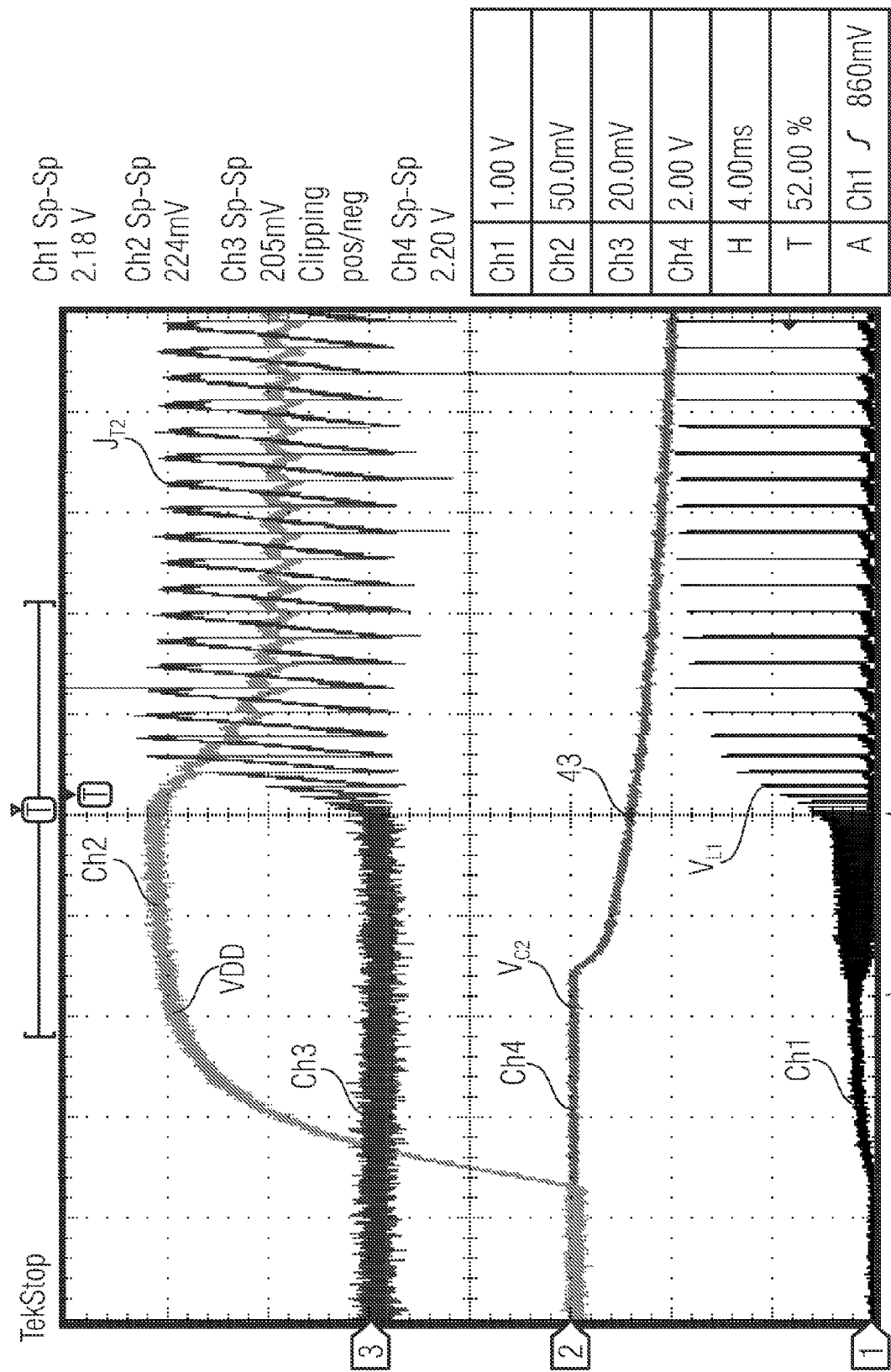
FIG. 6 shows current/voltage measurement curves at different points of the circuit diagram of the voltage converter circuit of FIG. 3.

In FIG. 6, the measured current/voltage courses at different measurement points of the voltage converter circuit of FIG. 5 are illustrated. On the x axis of the diagram, the time is plotted in milliseconds, wherein one interval corresponds to 4 ms. On the y axis, the input voltage VDD, the current through the second switch $I_{T2}$ and the voltage $V_{L1}$ at the first coil 12 and the voltage $V_{C2}$ at the capacitive element 26 of the feedback circuit 20 are represented. In the diagram, current and voltage values are represented, beginning with the startup phase until after the startup phase, i.e. in the operating phase of the clocked conversion of the input voltage. As it may be seen from the curve VDD, the input voltage first increases for a certain time after switching on, so that in this time a temporally variable current may flow via the electrically conductive first transistor $T_1$ to the reference potential, so that a voltage may be induced into the feedback circuit 24 and a negative voltage builds up, as described above and indicated in the measurement curve $V_{C2}$, at the capacitive element 26. This negative voltage, after the input voltage VDD has become constant or a temporal change of the current through the first coil has become sufficiently low, leads to the fact that at the gate terminal 13a of the first transistor $T_1$ a negative potential of the capacitive element 26 is applied and the first transistor is thus switched off. Thus, a reduction of the current in the first coil 12 results, which may be seen in the voltage curve $V_{L1}$ in the area 42. The reduction of the current in the coil again leads to a voltage induction and the cycle may restart. I.e., the voltage at the first coil 12 oscillates, as may be seen in section 42. As soon as the voltage in the capacitive element 26, or $C_2$, has reached the pinch-off or threshold voltage of the first transistor $T_1$ or a voltage which causes a permanent pinch-off of the first transistor $T_1$, the transistor $T_1$ is switched off and the second transistor $T_2$ takes over the current conduction, as is illustrated in the current curve $I_{T2}$. As described above, after the startup phase a self-oscillating oscillation takes place due to the feedback loop 24, i.e. through the switch $T_2$ energy is supplied to the induction coil in a clocked way. In this diagram, this is illustrated by the oscillating current $I_{T2}$ which is caused by switching on and off the transistor 17. As a consequence, at the induction coil also an oscillating voltage performance results, as is illustrated in FIG. 6 in the voltage curve $V_{L1}$.

Figure 7:
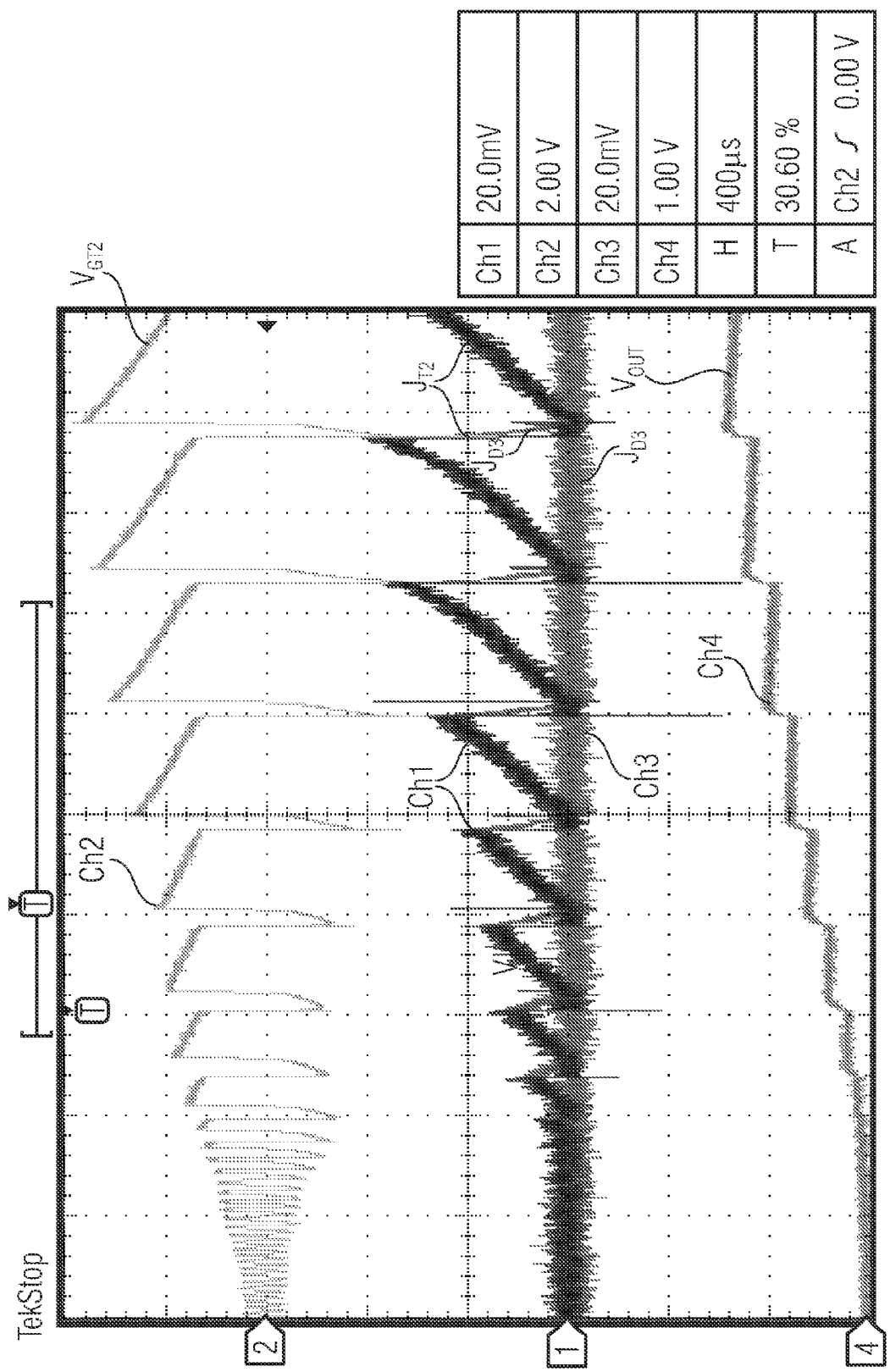
FIG. 7 shows further current/voltage measurement curves at the beginning of the clocked operating phase of the voltage converter circuit according to FIG. 3.

FIG. 7 shows the measurement curves of a control and/or gate voltage $V_{GT2}$, the current $I_{T2}$ into the current conducting channel of the second transistor, and a current through the diode D3, which is illustrated in the curve $I_{D3}$. Further, the output voltage $V_{out}$ is represented which is available at the output capacity 28. The time scale for these measurements, as is illustrated in FIG. 7, is 400 µs per interval unit. The current and voltage values in FIG. 7 are represented in the startup phase in which the second transistor $T_2$ takes over current conduction. Accordingly, the output voltage $V_{out}$ builds up step by step. In the different measurement curves, the clocked conversion is well obvious. In the phases in which the second transistor is switched on, i.e. a higher voltage than the turn-on voltage is applied to the control terminal of the second transistor, a significant current $I_{T2}$ flows through the transistor. After falling short of the turn-on voltage at the gate of the second transistor, the current flow through the second transistor abruptly stops, as is illustrated in the curve $I_{T2}$. In the phase in which the second transistor $T_2$ is switched off, then, as may be seen by the course of the curve $I_{D3}$, the energy and/or charge stored in the first coil 12 is transmitted via the controllable rectifier 29 to the output capacity 28. This transmission of charge takes place "in portions", as may be gathered from the stepped increase of the output voltage $V_{out}$, so that then at the corresponding locations and/or towards the corresponding locations, the output voltage is increased step by step.

Figure 8:
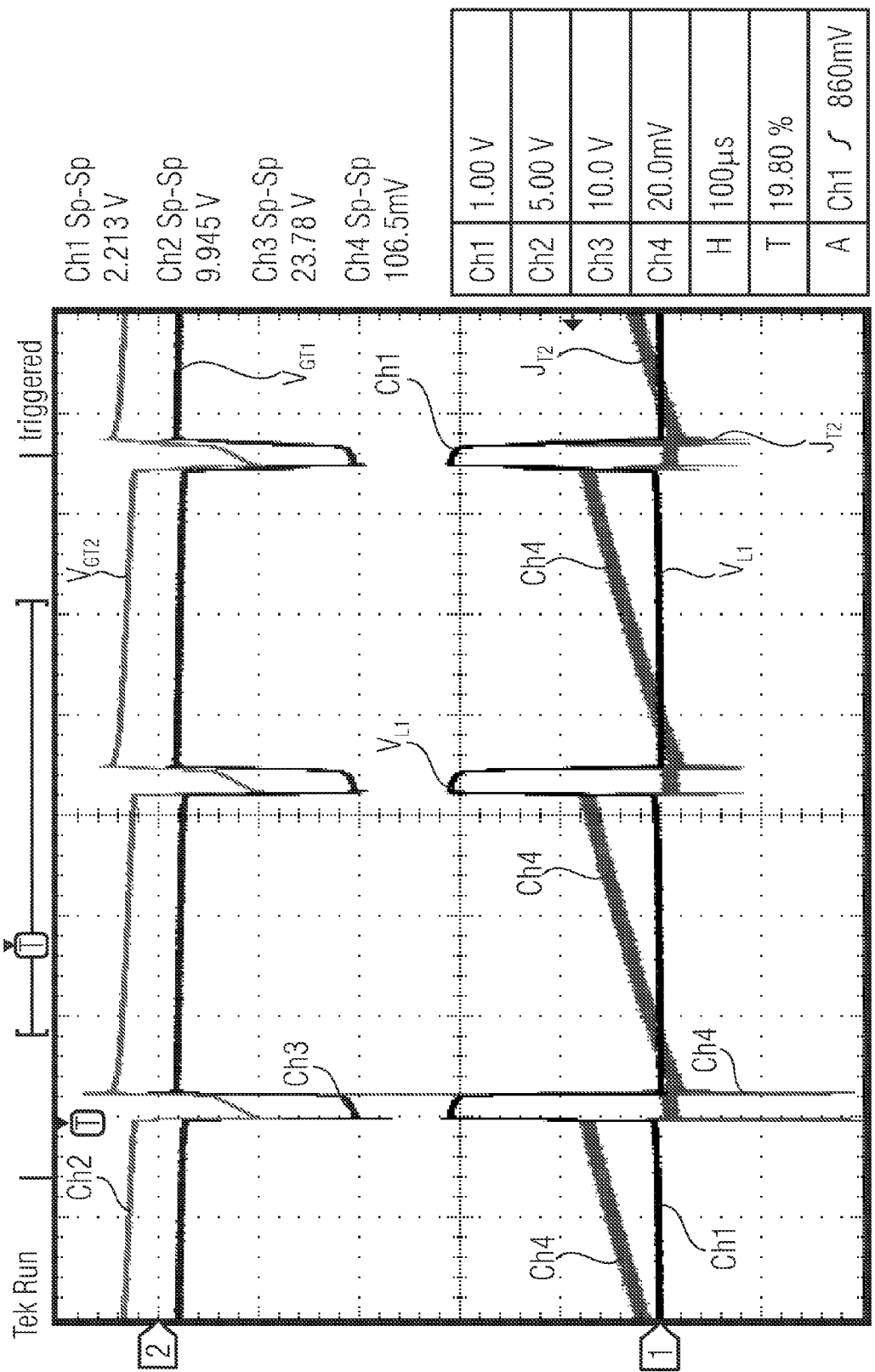
FIG. 8 shows a graphical illustration of a clocked voltage course at the control terminals of the first and the second switch and at the first coil and of the corresponding current in the second transistor during an operating phase of the voltage converter circuit.

FIG. 8 shows further measurements of current and voltage at different points of the voltage converter circuit of FIG. 5 during the operating phase. The temporal resolution for these measurements is 100 µs per time interval. The voltage converter circuit now operates periodically at a settable working frequency in the operating phase, as indicated above. The voltage at the control terminal of the first transistor $T_1$ is represented in curve $V_{GT1}$ and the voltage at the control terminal of the second transistor $T_2$ is represented in the curve $V_{GT2}$. The corresponding current through the second transistor $T_2$ and the corresponding voltage at the first coil 12 comprise the same periodicity. As may be seen from the two curves $V_{L1}$ and $I_{T2}$, the voltage at the first coil $L_1$ accordingly increases at times in which the current flow through the second transistor is interrupted. By the increase of the voltage in the first coil, now the charge may be transmitted to the output capacity via the switchable rectifier 29 coupled in series. I.e., the threshold voltage of the diode $D_3$ of the switchable rectifier is exceeded and the diode switches through. To optimize efficiency, now, as was illustrated in the embodiments, a transistor may be switched in parallel to the diode $D_3$ which takes over current conduction when normally the diode would conduct. As the transistor comprises a lower on resistance, i.e. a lower resistance in the on state, than the diode, by this measure the efficiency of the voltage converter circuit may be increased.

Figure 9:
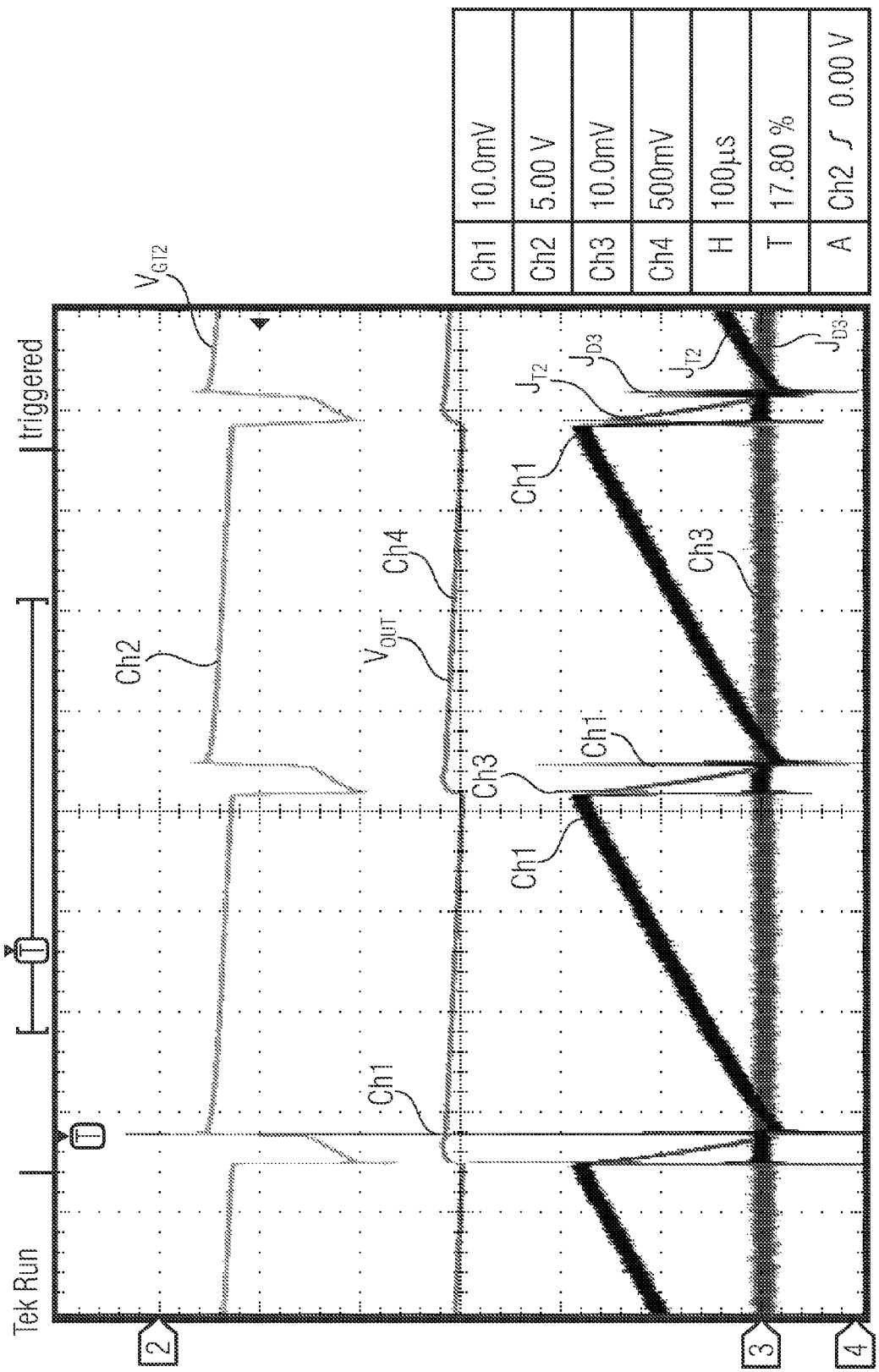
FIG. 9 shows measured current/voltage measurement curves of the output voltage, the control voltage and a graphical illustration of the clocked current course via the second switch and via a rectifying diode, according to the embodiment in FIG. 3.

FIG. 9 shows further current and/or voltage measurement curves at different measurement points of the voltage converter in FIG. 5. The current/voltage curves were again measured during the clocked operating phase, i.e. after the startup phase. The output voltage $V_{out}$ now has a virtually constant value. At the times at which the second transistor $T_2$ is switched off, i.e. the gate voltage $V_{GT2}$ is reduced, charge is supplied to the output capacity 28 from the first coil 12, so that the output voltage slightly increases again. This may be seen by the fact that in the phase in which the current $I_{T2}$ through the transistor decreases, the current $I_{D3}$ flows to the output capacity 28 via the diode $D_3$.

From the embodiments and the measurement curves in diagrams 4 to 7 it may be gathered that the startup phase and the operating phase may temporally overlap. I.e., in a transmission period, both the first switch 13 and also the second switch 17 may be active.

In some embodiments, after the startup phase both the control terminal of the first transistor and also the control terminal of the second transistor may be controlled to switch on the transistors. The second transistor, for example, in this case, due to its lower on resistance, takes over a main current flow. For example, a current flow through the second transistor may be at least five times as high as the one through the first transistor.

The present invention further provides a method for a clocked supply of energy to an energy storage based on an input voltage, which is applied to an input of a voltage converter circuit. The method comprises, as schematically illustrated in the block diagram in FIG. 10, a step of supplying 80 energy to the energy storage of the voltage converter circuit in a start-up phase, by activating a first switch, wherein the first switch comprises a smaller turn-on voltage according to amount than the second switch. The method further comprises supplying 85 energy in a clocked way to the energy storage of the voltage converter circuit after the start-up phase by activating the second switch. The second switch, which is connected in parallel to the first switch, comprises a higher turn-on voltage according to amount than the first switch.

In a further embodiment of the method for a clocked supply of energy to an energy storage, supplying 85 of energy in a clocked way to the energy storage of the voltage converter circuit may be executed by activating a second switch, wherein the second switch may be connected in parallel to the first switch, and the second switch may comprise a higher turn-on voltage than the first switch, according to amount. In the start-up phase, activating the second switch may comprise coupling a feedback signal to the control terminal of the second switch via a coupling. After the start-up phase, the method may include reducing the coupling.

The clocked supplying 85 of energy may, for example, be executed such that the voltage converter and/or the voltage converter circuit is excited to execute a self-oscillating oscillation, so that the first and/or the second switch is periodically switched on and off and so that by this energy is supplied to the energy storage. The energy storage may, for example, be an induction coil. Thus, by closing the first or the second switch, a temporally variable current flow may be caused in the induction coil, which is, for example, interrupted cyclically and which causes an intermediate storage of a corresponding magnetic energy in the form of a magnetic field in the induction coil. I.e., in embodiments of the present invention, the energy storage may also be regarded as an intermediate storage.

According to a further embodiment of the present invention, the clocked supplying 85 of energy to the energy storages may also comprise the transmission of charges in the clocked phase opposite to or inverse to the clocked phases, onto a second energy storage, for example onto the output capacitor 28 of the voltage converter. For example, the transmission of charges may be temporally offset to the clocked supply, for example such that the transmission of charges and the clocked supply take place alternatingly and/or in a temporally non-overlapping way. The clocked supply to energy to the energy storage and/or energy onto the output capacitor may be executed, according to a further embodiment, so that the frequency for this clocked process may be set by a load at the output capacitor.

In another embodiment of the method for the clocked supply of energy to an energy storage, the supply of energy 80 and 85 to the energy storage may be executed such that by a change of the energy in the energy storage or by an amount of energy in the energy storage a feedback between the first and the second switch and the energy storage is executed so that a self-oscillating oscillation may be caused in the voltage converter circuit.

The method for a clocked supply of energy may be executed such that the supply 80 of energy may be executed onto the energy storage of the voltage converter circuit with an input voltage which is smaller than 300 mV or even smaller than 100 mV according to amount. In some embodiments, the method is executed such that in a startup phase the supply of energy to the energy storage with the first transistor, which comprises a lower turn-on voltage than the second transistor, is executed and that, after the startup phase, the supply of energy to the energy storage is executed with a second transistor or at least basically by the second transistor, which comprises a smaller "on" resistance than the first transistor.

In some embodiments, thus the first transistor may, for example, be implemented as a self-conducting JFET, wherein the supply of energy to the energy storage may already start from an input voltage which is greater than 0 V and/or with a gate/source voltage of 0 V, according to amount.

In one embodiment regarding a further method for the clocked supply of energy to an energy storage 12, based on an input voltage VDD which is applied to an input 14 of a voltage converter circuit 10, a supply 110 of energy in a switchable way to the energy storage of the voltage converter circuit is executed depending on a control signal applied to a control terminal 100a of a switch arrangement. In another step of the method, a feedback signal is provided 120 with the help depending on a change of the energy stored in the energy storage or depending on an amount of energy stored in the energy storage. For providing 120 the feedback signal, the corresponding feedback circuit comprises a switchable coupling element which is implemented to couple the feedback signal to the control terminal 100a of the switch arrangement 15, and wherein the switchable coupling element is implemented to provide a stronger coupling effect in a startup phase than after the startup phase.

Figure 11:
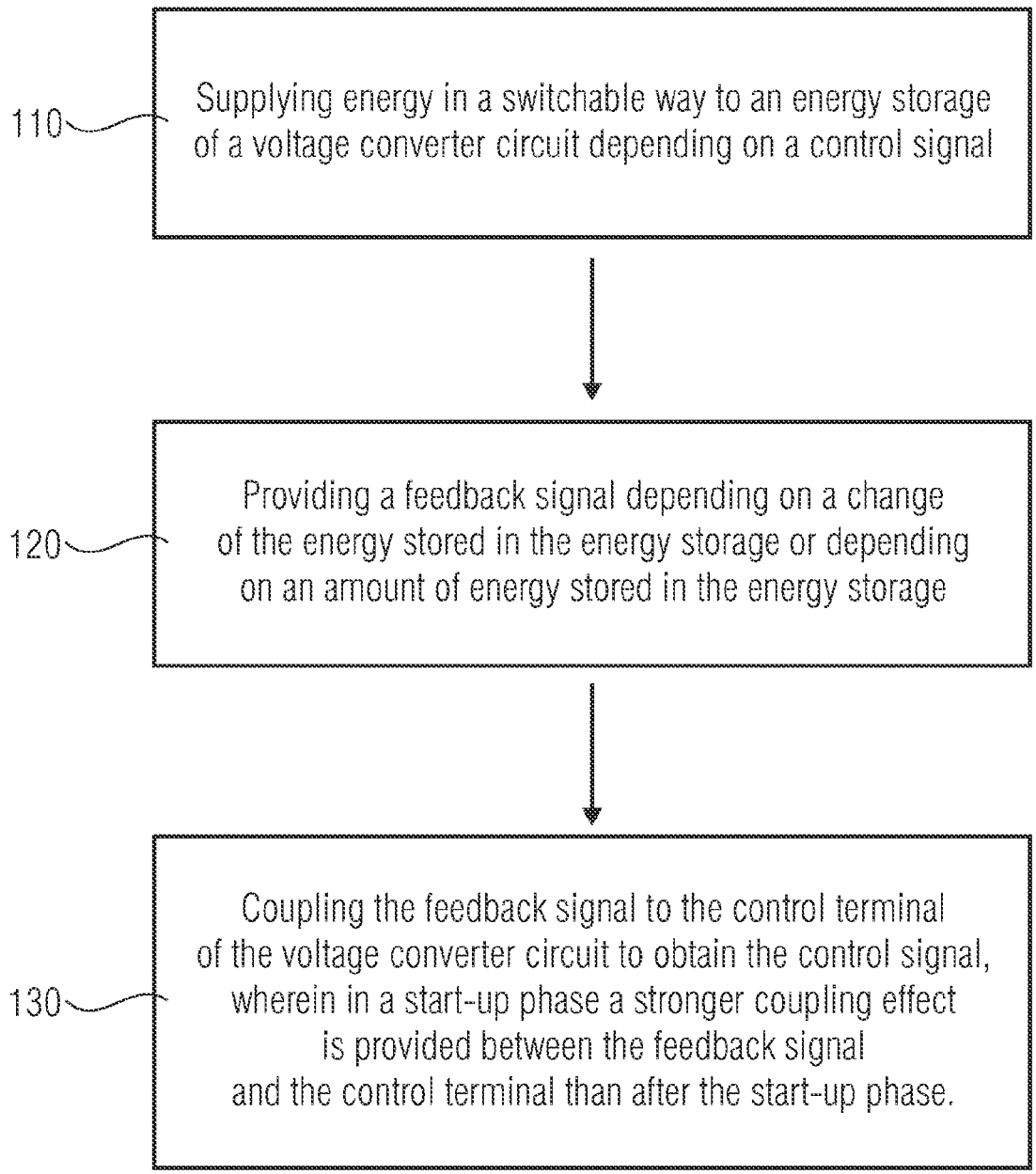
FIG. 11 shows a flowchart of a further method for a clocked supply of energy to an energy storage according to a further embodiment of the present invention.

FIG. 11 shows a flowchart of a further embodiment regarding the further method for the clocked supply of energy to an energy storage, based on an input voltage VDD which is applied to an input 14 of a voltage converter circuit 10. The further method comprises a step of supplying 110 energy in a switchable way to the energy storage of the voltage converter circuit depending on a control signal. Further, the method comprises providing 120 a feedback signal depending on a change of the energy stored in the energy storage or depending on an amount of energy stored in the energy storage, and coupling 130 the feedback signal to the control terminal of the switch arrangement to obtain the control signal, wherein in a startup phase a stronger coupling effect between the feedback signal and the control terminal is provided than after the startup phase.

The method according to FIGS. 10 and 11 and according to the described embodiments with respect to the methods may, by the way, be supplemented by all those functions and features which are described herein, also with reference to embodiments of the device.

According to embodiments, the presented voltage converter may work with coupled coils and, for example, already start at an input voltage of 60 mV. Here, the voltage converter may comprise, already with small dimensions, more than 50 percent efficiency with an output voltage of 2V and an output power of 1 mW. By the voltage converter and/or by the voltage converter circuit presented here, a high efficiency of the voltage conversion may be achieved with very low input voltages (below 300 mV). As illustrated in the embodiments, the circuit may be set up from individual components, i.e. it is not essential to use an integrated circuit. Still, the amount of components may be relatively low. As it was illustrated in the embodiments, the requirements regarding the transformer to be used, i.e. the coupled coils, may be high, but with a corresponding selection of the components and the core materials, all in all small dimensions of the overall arrangement may be achieved. It is, of course, also possible that the voltage converter circuit and/or the voltage converter is realized completely or at least partially in the form of an integrated circuit.

According to embodiments, the voltage converter circuit may be implemented as a synchronous step-up converter, i.e. an up-converter having a feedback loop which allows the output voltage to be regulated during the operating phase, or as a boost chopper.

It is also possible, however, that a correspondingly modified voltage converter circuit is implemented as a buck chopper, wherein the output voltage is smaller than the input voltage.

It is further to be noted that, in embodiments of the present invention, the feedback circuit may comprise a switchable coupling element (24) which may be implemented as a switchable capacitive element.

As it is illustrated in some embodiments, after the startup phase, a second MOSFET transistor $T_2$ which is connected in parallel to a JFET transistor $T_1$ may serve as a switching element for a clocked conversion of the voltage. The parallel connection of the two transistors on the one hand allows using a small input voltage for the starting process of the voltage converter, as the first transistor may be normally on and comprise a zero threshold gate voltage and, on the other hand, comprise high efficiency during the operating phase, as the second MOSFET 17 comprises a low on resistance in the on state.

In one embodiment, the energy storage of the voltage converter circuit is a coil which is inductively coupled to an inductive element of a feedback circuit so that, depending on a change of the energy stored in the coil, a self-oscillating oscillation may be excited in the voltage converter circuit.

In another embodiment, in one voltage converter circuit the frequency of the self-oscillating oscillation for a clocked supply of energy to the energy storage depends on a resistor/capacitor time constant.

In another embodiment, in one voltage converter circuit the energy storage is coupled to the feedback circuit such that, depending on a change of the energy stored in the energy storage or depending on an amount of energy stored in the energy storage, a feedback signal results which excites the voltage converter circuit to self-oscillating oscillations.

In another embodiment, in one voltage converter circuit the control terminal of the second switch is coupled to a locked loop which is implemented to influence the frequency of the clocked supply of energy to the energy storage.

In another embodiment, in one voltage converter circuit the energy storage is coupled to an output capacity via a switched rectifier, wherein the capacity is implemented to supply an output voltage depending on a load transmitted from the energy storage, wherein the output voltage is higher than an input voltage which is applied at an input of the voltage converter circuit.

In another embodiment, in one voltage converter circuit the control terminal of the second switch is wired up such that the second switch is active after the startup phase to supply energy to the energy storage in a clocked way; and the voltage converter circuit is implemented to transmit charge from the energy storage to the output capacity to provide an output voltage at the output capacity when the second switch is open.

In another embodiment, in one voltage converter circuit the control terminal of the second switch is coupled to a locked loop which is implemented, depending on a load at the output capacity, to control a frequency for the clocked supply of energy to the energy storage and the transmission of charges from the energy storage to the output capacity.

In another embodiment, in one voltage converter circuit the locked loop is implemented to decrease the frequency the higher the load at the output capacity.

In another embodiment, the one voltage converter circuit further comprises a protection circuit coupled to the control terminal of the second switch and implemented to protect the second switch against an overvoltage.

In another embodiment, in one voltage converter circuit the protection circuit comprises two oppositely coupled Zener diodes.

In another embodiment, in one voltage converter circuit the control terminal of the second switch is coupled to a locked loop; the locked loop is implemented to influence a frequency of supplying energy to the energy storage and transmitting a charge from the energy storage to an output capacity coupled to the energy storage, wherein an output voltage is provided at the output capacity; the locked loop comprises a positive voltage limitation or a negative voltage limitation; and the locked loop is implemented to change a voltage limitation value of the voltage limitation or a response of the voltage limitation depending on a load at the output capacity, to thus change a ratio between a turn-on time of the second switch and a turn-off time of the second switch.

In another embodiment, in one voltage converter circuit the first switch comprises a normally on transistor, and wherein the second switch comprises a normally off transistor.

In another embodiment, in one voltage converter circuit the second switch comprises a lower on resistance than the first switch.

In another embodiment, in one voltage converter circuit the feedback circuit is implemented to enable an oscillation build-up already with an input voltage of less than 100 mV.

In another embodiment, in one voltage converter circuit the first switch is a junction field effect transistor, and the second switch is metal oxide semiconductor field effect transistor.

In another embodiment, in one voltage converter the first transistor is implemented as a junction field effect transistor, and the second transistor is implemented as a metal oxide semiconductor field effect transistor; and the voltage converter is implemented to couple the first coil via the JFET to the reference potential in the startup phase so that, at the beginning of the startup phase, a current flow through the JFET is at least five times as high as a current flow through the MOSFET, and to execute a clocked conversion of an input voltage into an output voltage using the MOSFET after the startup phase so that, after the startup phase, a current flow through the MOSFET is at least ten times as high as a current flow through the JFET.

In another embodiment, in one voltage converter an on resistance of the JFET is at least five times as high as an on resistance of the MOSFET.

In another embodiment, in one voltage converter the voltage converter is implemented such that, based on an inductive coupling of the first coil to the second and the third coil, the feedback circuit of the voltage converter may be excited to self-oscillating oscillations.

In another embodiment, in one voltage converter the voltage converter is implemented such that the self-oscillating oscillation already starts at an input voltage which is smaller according to amount than a turn-on voltage of the second transistor; and the voltage converter is implemented to couple a feedback signal to the control terminal of the second transistor in the startup phase, so that a voltage at the control terminal of the second transistor reaches the turn-on voltage of the second transistor, wherein the input voltage is smaller than the threshold voltage of the second transistor.

In another embodiment, in one voltage converter the controllable rectifying element comprises a diode having a controllable transistor connected in parallel.

In another embodiment, in one voltage converter the control terminal of the second transistor is coupled to a locked loop which is implemented to control a frequency for the clocked coupling and transmission of charge from the first coil to the output capacitor depending on a load at the output capacitor, the control terminal of the second transistor is wired up with a first branch for a negative voltage limitation, wherein the first branch includes a diode and a resistive element which are connected between the control terminal of the second transistor and the reference potential, and the control terminal is wired up with a second branch for a positive voltage limitation, wherein the second branch includes a diode and a settable, resistive element which are connected between the control terminal of the second transistor and the reference potential; the settable, resistive element includes a control transistor whose load path comprises a settable resistance, wherein the control transistor is wired up such that a resistance of the load path of the control transistor depends on the output voltage of the voltage converter.

In another embodiment, in one voltage converter the voltage converter is set up from discrete electric components.

In another embodiment, in one voltage converter the voltage converter comprises a feedback circuit for generating control signals for the first switch and the second switch, wherein the feedback circuit is inductively coupled to the first coil via a second and a third coil, and wherein the turns ratio of the first coil to the second and third coil is between 1:4 and 1:25.

In another embodiment, in one voltage converter the voltage converter comprises a feedback circuit, wherein the feedback circuit is coupled to the first coil via a second and a third coil, and wherein the first, the second and the third coils comprise a coil core material having an absolute magnetic permeability μ of higher than $6.28 \times 10^{-5}$ H/m.

In another embodiment, in one voltage converter the voltage converter further comprises a voltage protection circuit connected between the control terminal of the second transistor and the reference potential, wherein the voltage protection circuit comprises two oppositely coupled Zener diodes.

In another embodiment, in one method the supply of energy in a clocked way to the energy storage includes exciting a self-oscillating oscillation of the voltage converter circuit.

In another embodiment, in one method the supply of energy to the energy storage of the voltage converter circuit in the startup phase and the supply of energy in a clocked way after the startup phase includes a coupling of feedback signals which are based on a change of the energy in the energy storage to the control terminals of the first switch and the second switch.

In another embodiment, in one method the supply of energy in a clocked way includes a load-dependent control of a control terminal of the second switch with a locked loop, wherein an operating frequency of the voltage converter circuit is lower, the higher a load which is coupled to an output of the voltage converter circuit.

In another embodiment, in one method the supply of energy to the energy storage is executed in a startup phase and the supply of energy in a clocked way is executed after the startup phase at an input voltage which is smaller than 300 mV or smaller than 250 mV.

In another embodiment, in one method the supply of energy to the energy storage takes place after the startup phase such that a current flow through the second switch is at least ten times as high as a current flow through the first switch.

In another embodiment, in one voltage converter circuit the switch arrangement comprises a switch which is implemented to supply energy in a switchable way to the energy storage depending on a control signal applied to the control terminal of the switch arrangement.

In another embodiment, in one voltage converter circuit the energy storage is a coil, and the feedback circuit comprises an inductive element magnetically coupled to the coil, so that, by a change of the energy stored in the coil, a voltage is induced in the inductive element which serves as the feedback signal.

In another embodiment, in one voltage converter circuit the switchable capacitive element comprises a start assistance switch which is wired up such that the switchable capacitive element provides a stronger coupling effect in the startup phase than after the startup phase.

In another embodiment, in one voltage converter circuit the start assistance switch is implemented as a junction field effect transistor whose control terminal is coupled to the energy storage so that the start assistance switch is active in the startup phase to cause a stronger coupling in the startup phase than after the startup phase.

In another embodiment, in one voltage converter circuit the start assistance switch is wired up so that a coupling effect of the switchable capacitive element onto the control terminal of the switch arrangement is periodically changed during the startup phase.

In another embodiment, in one voltage converter circuit the voltage converter circuit further comprises a capacitive element which is implemented to build up a potential depending on a change of the energy in the energy storage or depending on an amount of energy in the energy storage, wherein the potential works towards switching off a start assistance switch which enables a change of the coupling effect, so that the start assistance switch is switched off after the startup phase.

In another embodiment, in one voltage converter circuit the energy storage is a coil which is inductively coupled to an inductive element of the feedback circuit, so that, depending on a change of the energy stored in the coil, a self-oscillating oscillation may be excited in the voltage converter circuit.

In another embodiment, in one voltage converter circuit the energy storage is coupled to the feedback circuit such that, depending on a change of the energy stored in the energy storage or depending on an amount of energy stored in the energy storage, a feedback signal results which excites the voltage converter circuit to execute self-oscillating oscillations.

In another embodiment, in one voltage converter circuit the energy storage is coupled to an output capacity via a rectifier, wherein the output capacity is implemented to provide an output voltage based on a charge transmitted from the energy storage which is higher than an input voltage applied to the input of the voltage converter circuit.

In another embodiment, in one voltage converter circuit the start assistance switch is a junction field effect transistor, and a switch of the switch arrangement which is implemented to close a circuit for supplying energy to the energy storage is a metal oxide semiconductor field effect transistor.

In another embodiment, in one voltage converter circuit the switchable coupling element is implemented to provide a stronger coupling effect in a startup phase than after the startup phase, so that a switch of the voltage converter circuit is active from an input voltage which is smaller than a turn-on voltage of the switch to supply energy to the energy storage.

In another embodiment, in one voltage converter circuit the switch arrangement comprises a first switch and a second switch which are connected in parallel to each other, wherein the first switch comprises a smaller turn-on voltage according to amount than the second switch, wherein a control terminal of the first switch is wired up so that the first switch is active in a startup phase of the voltage converter circuit to supply energy to the energy storage, and wherein a control terminal of the second switch is wired up so that the second switch is active after the startup phase to supply energy to the energy storage in a clocked way; and wherein the feedback circuit comprises a switchable coupling element which is implemented to couple the feedback signal to the control terminal of the second switch.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

A voltage converter circuit 10 for a clocked supply of energy to an energy storage 12 based on an input voltage VDD applied at an input 14 of the voltage converter circuit may comprise: an energy storage 12; a switch arrangement 15, wherein the switch arrangement comprises a first switch 13 and a second switch 17 which are connected in parallel, wherein the switch arrangement is coupled to the energy storage, wherein the first switch comprises a turn-on voltage which is smaller, according to amount, than the second switch, wherein a control terminal 13a of the first switch 13 is wired up such that the first switch is active in a startup phase of the voltage converter circuit to supply energy to the energy storage, and wherein a control terminal 17a of the second switch is wired up such that the second switch 17 is active after the startup phase to supply energy to the energy storage 12 in a clocked way; and a feedback circuit 20 which is implemented to provide a feedback signal depending on a change of the energy stored in the energy storage 12 or depending on an amount of energy stored in the energy storage, wherein the feedback circuit 20 comprises a switchable coupling element 24 which is implemented to couple the feedback signal to the control terminal 17a of the second switch, wherein the switchable coupling element 24 is implemented to provide a stronger coupling effect in a startup phase than after the startup phase.

In one embodiment of the above voltage converter circuit 10, the energy storage is a coil 12 which is inductively coupled to an inductive element 22 of a feedback circuit 20 so that, depending on a change of the energy stored in the coil, a self-oscillating oscillation may be excited in the voltage converter circuit.

In another embodiment of the above voltage converter circuit, the frequency of the self-oscillating oscillation for a clocked supply of energy to the energy storage 12 depends on a resistor/capacitor time constant.

In another embodiment of the above voltage converter circuit, the energy storage is coupled to the feedback circuit 29 such that, depending on a change of the energy stored in the energy storage or depending on an amount of energy stored in the energy storage, a feedback signal results which excites the voltage converter circuit to self-oscillating oscillations.

In another embodiment of the above voltage converter circuit, the control terminal 17a of the second switch 17 is coupled to a locked loop 27 which is implemented to influence the frequency of the clocked supply of energy to the energy storage 12.

In another embodiment of the above voltage converter circuit, the energy storage is coupled to an output capacity 28 via a switched rectifier 29, wherein the capacity is implemented to supply an output voltage depending on a load transmitted from the energy storage, wherein the output voltage is higher than an input voltage which is applied at an input of the voltage converter circuit.

In still another embodiment of the above voltage converter circuit, the control terminal 17a of the second switch 17 is wired up such that the second switch is active after the startup phase to supply energy to the energy storage in a clocked way; and the voltage converter circuit is implemented to transmit charge from the energy storage 12 to the output capacity 28 to provide an output voltage at the output capacity when the second switch is open.

In another embodiment of the above voltage converter circuit 10, the control terminal 17a of the second switch is coupled to a locked loop 27 which is implemented, depending on a load at the output capacity 28, to control a frequency for the clocked supply of energy to the energy storage and the transmission of charges from the energy storage to the output capacity.

In another embodiment of the above voltage converter circuit, the locked loop 27 is implemented to decrease the frequency the higher the load at the output capacity.

In another embodiment, the above voltage converter circuit further comprises a protection circuit coupled to the control terminal 17a of the second switch 17 and implemented to protect the second switch against an overvoltage.

In another embodiment of the above voltage converter circuit, the protection circuit comprises two oppositely coupled Zener diodes 36, 37.

In still another embodiment of the above voltage converter circuit, the control terminal of the second switch is coupled to a locked loop 27; the locked loop is implemented to influence a frequency of supplying energy to the energy storage and transmitting a charge from the energy storage 12 to an output capacity 28 coupled to the energy storage, wherein an output voltage is provided at the output capacity; the locked loop 27 comprises a positive voltage limitation 27a or a negative 27b voltage limitation; and the locked loop is implemented to change a voltage limitation value of the voltage limitation or a response of the voltage limitation depending on a load at the output capacity 28, to thus change a ratio between a turn-on time of the second switch and a turn-off time of the second switch.

In another embodiment of the above voltage converter circuit, the first switch comprises a normally on transistor, and wherein the second switch comprises a normally off transistor.

In another embodiment of the above voltage converter circuit, the second switch comprises a lower on resistance than the first switch.

In another embodiment of the above voltage converter circuit, the feedback circuit is implemented to enable an oscillation build-up already with an input voltage of less than 100 mV.

In another embodiment of the above voltage converter circuit, the first switch is a junction field effect transistor JFET, and the second switch is metal oxide semiconductor field effect transistor MOSFET.

A voltage converter 10 for the clocked conversion of an input voltage VDD applied at an input 14 of the voltage converter into an output voltage available at an output of the voltage converter may comprise: a first coil 12, wherein a terminal of the coil is coupled to the input 14 of the voltage converter; a controllable rectifying element 29 connected in series with the first coil 12; an output capacitor 28 interconnected with the controllable rectifying element 29 and implemented to storage a charge so that at the output capacitor 28 an output voltage $V_{out}$ is available; and a switch arrangement 15; a feedback circuit 20 which is implemented to provide a feedback signal depending on a change of the energy stored in the first coil 12 or depending on an amount of energy stored in the first coil, wherein the switch arrangement 15 is implemented to couple the first coil to a reference potential VSS to supply energy to the first coil; wherein the switch arrangement comprises a first transistor 13 and a second transistor 17 connected in parallel to each other; wherein the first transistor 13 comprises a smaller threshold voltage than the second transistor, according to amount; wherein a control terminal 13a of the first transistor is wired up such that the first transistor is active in a startup phase of the voltage converter to enable a coupling of the first coil 12 to the reference potential VSS to build up a current flow through the first coil; wherein the feedback circuit 20 comprises a switchable capacitive element 24 which is implemented to couple the feedback signal to the control terminal 17a of a second switch 17, wherein the switchable capacitive element 24 is implemented to provide a stronger coupling effect in a startup phase than after the startup phase, wherein a control terminal 17a of the second transistor 17 is wired up such that the second transistor 17 enables a clocked coupling of the first coil 12 to the reference potential VSS after the startup phase; and wherein the controlled rectifier element is implemented to transmit charges from the first coil 12 to the output capacitor 28 when the switch arrangement is switched off.

In one embodiment of the above voltage converter, the first transistor is implemented as a junction field effect transistor JFET 13, and the second transistor is implemented as a metal oxide semiconductor field effect transistor MOSFET 17; and the voltage converter is implemented to couple the first coil 12 via the JFET 13 to the reference potential VSS in the startup phase so that, at the beginning of the startup phase, a current flow through the JFET is at least five times as high as a current flow through the MOSFET, and to execute a clocked conversion of an input voltage into an output voltage using the MOSFET 17 after the startup phase so that, after the startup phase, a current flow through the MOSFET is at least ten times as high as a current flow through the JFET.

In another embodiment of the above voltage converter, an on resistance of the JFET is at least five times as high as an on resistance of the MOSFET.

In another embodiment of the above voltage converter, the voltage converter is implemented such that, based on an inductive coupling of the first coil to the second and the third coil, the feedback circuit of the voltage converter may be excited to self-oscillating oscillations.

In another embodiment of the above voltage converter, the voltage converter is implemented such that the self-oscillating oscillation already starts at an input voltage which is smaller according to amount than a turn-on voltage of the second transistor; and the voltage converter is implemented to couple a feedback signal to the control terminal of the second transistor in the startup phase, so that a voltage at the control terminal of the second transistor reaches the turn-on voltage of the second transistor, wherein the input voltage is smaller than the threshold voltage of the second transistor.

In another embodiment of the above voltage converter, the controllable rectifying element comprises a diode 38 having a controllable transistor 39 connected in parallel.

In still another embodiment of the above voltage converter, the control terminal of the second transistor is coupled to a locked loop 27 which is implemented to control a frequency for the clocked coupling and transmission of charge from the first coil 12 to the output capacitor 28 depending on a load at the output capacitor 28, the control terminal 17a of the second transistor is wired up with a first branch 27a for a negative voltage limitation, wherein the first branch 27a includes a diode 30 and a resistive element 31 which are connected between the control terminal of the second transistor and the reference potential VSS, and the control terminal is wired up with a second branch for a positive voltage limitation, wherein the second branch includes a diode and a settable, resistive element which are connected between the control terminal of the second transistor and the reference potential; wherein the settable, resistive element includes a control transistor 33 whose load path comprises a settable resistance, wherein the control transistor is wired up such that a resistance of the load path of the control transistor depends on the output voltage of the voltage converter.

In another embodiment of the above voltage converter, the voltage converter is set up from discrete electric components.

In still another embodiment of the above voltage converter, the voltage converter comprises a feedback circuit 20 for generating control signals for the first switch and the second switch, the feedback circuit 20 is inductively coupled to the first coil 12 via a second $L_2$ and a third coil $L_3$, and the turns ratio of the first coil to the second and third coil is between 1:4 and 1:25.

In another embodiment of the above voltage converter, the voltage converter comprises a feedback circuit, the feedback circuit is coupled to the first coil via a second and a third coil, and the first, the second and the third coils comprise a coil core material having an absolute magnetic permeability µ of higher than $6.28\times10^{-5}$ H/m.

In another embodiment of the above voltage converter, the voltage converter further comprises a voltage protection circuit connected between the control terminal 17a of the second transistor and the reference potential VSS, wherein the voltage protection circuit comprises two oppositely coupled Zener diodes.

A method for the clocked supply of energy to an energy storage 12, based on an input voltage VDD applied at an input 14 of a voltage converter circuit 10 may comprise the steps of: supplying 80 energy to the energy storage of the voltage converter circuit in a startup phase by activating a first switch; and supplying 80 energy to the energy storage of the voltage converter circuit in a startup phase by activating a first switch; and supplying 85 energy in a clocked way to the energy storage of the voltage converter circuit by activating a second switch, wherein activating the second switch in the startup phase includes coupling a feedback signal to the control terminal of the second switch via a coupling, and wherein the method includes a reduction of the coupling after the startup phase, wherein the second switch is connected in parallel to the first switch and the second switch comprises a higher turn-on voltage than the first switch according to amount.

In one embodiment of the above method, the supply of energy in a clocked way to the energy storage includes exciting a self-oscillating oscillation of the voltage converter circuit.

In another embodiment of the above method, the supply 80 of energy to the energy storage of the voltage converter circuit in the startup phase and the supply 85 of energy in a clocked way after the startup phase includes a coupling of feedback signals which are based on a change of the energy in the energy storage 12 to the control terminals of the first switch and the second switch.

In another embodiment of the above method, the supply 85 of energy in a clocked way includes a load-dependent control of a control terminal of the second switch with a locked loop 27, wherein an operating frequency of the voltage converter circuit is lower, the higher a load which is coupled to an output of the voltage converter circuit.

In another embodiment of the above method, the supply 80 of energy to the energy storage is executed in a startup phase and the supply 85 of energy in a clocked way is executed after the startup phase at an input voltage VDD which is smaller than 300 mV or smaller than 250 mV.

In still another embodiment of the above method, the supply 80 of energy to the energy storage takes place after the startup phase such that a current flow through the second switch is at least ten times as high as a current flow through the first switch.

A voltage converter circuit 10 for the clocked supply of energy to an energy storage 12 based on an input voltage VDD which is applied to an input 14 of the voltage converter circuit may comprise: an energy storage 12; a switch arrangement 15 having a control terminal 100a, wherein the switch arrangement is coupled to the energy storage to supply energy in a switchable way to the energy storage depending on a control signal applied to the control terminal; a feedback circuit 20 which is implemented to provide a feedback signal depending on a change of the energy stored in the energy storage 12 or depending on an amount of energy stored in the energy storage, wherein the feedback circuit 20 comprises a switchable coupling element 24 which is implemented to couple the feedback signal to the control terminal 100a, and wherein the switchable coupling element 24 is implemented to provide a stronger coupling effect in a startup phase of the voltage conversion than after the startup phase.

In one embodiment of the above voltage converter circuit 10, the switch arrangement 15 comprises a switch 100 which is implemented to supply energy in a switchable way to the energy storage depending on a control signal applied to the control terminal 100a of the switch arrangement 15.

In another embodiment of the above voltage converter circuit 10, the energy storage is a coil 12, and the feedback circuit comprises an inductive element 22 magnetically coupled to the coil, so that, by a change of the energy stored in the coil 12, a voltage is induced in the inductive element 22 which serves as the feedback signal.

In another embodiment of the above voltage converter circuit 10, the switchable capacitive element 24 comprises a start assistance switch 24b which is wired up such that the switchable capacitive element 24 provides a stronger coupling effect in the startup phase than after the startup phase.

In still another embodiment of the above voltage converter circuit 10, the start assistance switch 24b is implemented as a junction field effect transistor whose control terminal 24b' is coupled to the energy storage 12 so that the start assistance switch 24b is active in the startup phase to cause a stronger coupling in the startup phase than after the startup phase.

In another embodiment of the above voltage converter circuit 10, the start assistance switch 24b is wired up so that a coupling effect of the switchable capacitive element 24 onto the control terminal 100a of the switch arrangement 15 is periodically changed during the startup phase.

In another embodiment, the above voltage converter circuit 10 further comprises a capacitive element 26 which is implemented to build up a potential depending on a change of the energy in the energy storage or depending on an amount of energy in the energy storage, wherein the potential works towards switching off a start assistance switch 24b which enables a change of the coupling effect, so that the start assistance switch is switched off after the startup phase.

In another embodiment of the above voltage converter circuit, the energy storage is a coil 12 which is inductively coupled to an inductive element 22 of the feedback circuit 20, so that, depending on a change of the energy stored in the coil, a self-oscillating oscillation may be excited in the voltage converter circuit.

In still another embodiment of the above voltage converter circuit, the energy storage is coupled to the feedback circuit 20 such that, depending on a change of the energy stored in the energy storage or depending on an amount of energy stored in the energy storage, a feedback signal results which excites the voltage converter circuit to execute self-oscillating oscillations.

In another embodiment of the above voltage converter circuit, the energy storage is coupled to an output capacity 28 via a rectifier 38, wherein the output capacity is implemented to provide an output voltage based on a charge transmitted from the energy storage which is higher than an input voltage applied to the input of the voltage converter circuit.

In another embodiment of the above voltage converter circuit, the start assistance switch 24b is a junction field effect transistor JFET, and wherein a switch 100 of the switch arrangement 15 which is implemented to close a circuit for supplying energy to the energy storage is a metal oxide semiconductor field effect transistor MOSFET.

In another embodiment of the above voltage converter circuit, the switchable coupling element is implemented to provide a stronger coupling effect in a startup phase than after the startup phase, so that a switch 100 of the voltage converter circuit is active from an input voltage VDD which is smaller than a turn-on voltage of the switch 100 to supply energy to the energy storage.

In still another embodiment of the above voltage converter circuit 10, the switch arrangement 15 comprises a first switch 13 and a second switch 17 which are connected in parallel to each other, the first switch 13 comprises a smaller turn-on voltage according to amount than the second switch 17, a control terminal 13a of the first switch 13 is wired up so that the first switch is active in a startup phase of the voltage converter circuit to supply energy to the energy storage, and a control terminal 17a of the second switch 17 is wired up so that the second switch is active after the startup phase to supply energy to the energy storage 12 in a clocked way; and the feedback circuit 20 comprises a switchable coupling element 24 which is implemented to couple the feedback signal to the control terminal 17a of the second switch 17.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A voltage converter circuit for a clocked supply of energy to an energy storage based on an input voltage applied at an input of the voltage converter circuit, comprising:
   an energy storage;
   a switch arrangement,
   wherein the switch arrangement comprises a first switch and a second switch which are connected in parallel,
   wherein the switch arrangement is coupled to the energy storage,
   wherein the first switch comprises a turn-on voltage which is smaller, according to amount, than the second switch,
   wherein a control terminal of the first switch is wired up such that the first switch is active in a startup phase of the voltage converter circuit to supply energy to the energy storage, and
   wherein a control terminal of the second switch is wired up such that the second switch is active after the startup phase to supply energy to the energy storage in a clocked way; and
   a feedback circuit which is implemented to provide a feedback signal depending on a change of the energy stored in the energy storage or depending on an amount of energy stored in the energy storage, wherein the feedback circuit comprises a switchable coupling element which is implemented to couple the feedback signal to the control terminal of the second switch,
wherein the switchable coupling element is implemented to provide a stronger coupling effect in a startup phase than after the startup phase.

2. The voltage converter circuit according to claim 1, wherein the energy storage is a coil;
wherein the feedback circuit comprises an inductive element magnetically coupled to the coil so that, by a change in the energy stored in the coil, a voltage is induced in the inductive element.
wherein the feedback circuit being the switchable coupling element comprises a switchable capacitive element which is implemented to couple the voltage induced in the inductive element to the control terminal of the second switch.

3. The voltage converter circuit according to claim 2, wherein the switchable, capacitive element comprises a third switch which is wired up such that the switchable, capacitive element provides a stronger coupling effect in the startup phase than after the startup phase.

4. The voltage converter circuit according to claim 3, wherein the third switch is implemented as a junction field effect transistor whose control terminal is coupled to the energy storage such that the third switch is active in the startup phase to cause a stronger coupling than after the startup phase.

5. The voltage converter circuit according to claim 3, wherein the third switch is wired up such that a coupling effect of the switchable, capacitive element onto the control terminal of the second transistor is periodically changed during the startup phase.

6. The voltage converter circuit according to claim 3, wherein the voltage converter circuit further comprises a capacitive element which is implemented to build up a potential depending on a change of the energy in the energy storage or the amount of energy in the energy storage, wherein the potential works towards switching off the third switch.

7. The voltage converter circuit according to claim 3, wherein the third switch comprises a rectifying junction transition from a control terminal to a load path terminal; and
wherein the voltage converter circuit further comprises a capacitive element which is implemented to build up a potential which works towards switching off the third switch using a rectifying effect of the junction transition of the third switch, or which is implemented to build up the potential working towards switching off the third switch using a rectifying effect of a junction transition of the first transistor.

8. The voltage converter circuit according to claim 1, wherein the feedback circuit is implemented to control the control terminal of the first switch;
wherein the feedback circuit is implemented to control, in a startup phase, the control terminal of the first switch coupled to the inductive element such that energy is supplied to the coil through the first switch; and
wherein the feedback circuit is implemented to build up a potential during the startup phase by a voltage induced in the inductive element, the potential working towards switching off the first switch.

9. The voltage converter circuit according to claim 1, wherein the feedback circuit is implemented to control the first switch in the startup phase such that a supply of energy to the coil is periodically interrupted by the first switch, and
wherein the feedback circuit is implemented to build up the potential during the startup phase which works towards switching off the first switch such that a periodic switching on and off of the first switch is prevented.

10. The voltage converter circuit according to claim 1, wherein the feedback circuit comprises a capacitive element which is coupled to the inductive element,
wherein the voltage converter circuit is implemented to load the capacitive element to a steady component so that after the startup phase a potential is applied to the capacitive element which ends the supply of energy to the coil with the first switch.

11. The voltage converter circuit according to claim 1, wherein the first switch comprises a rectifying junction transition from a control terminal to a load path terminal; and
wherein the feedback circuit is implemented to build up the potential working towards switching off the first switch using a rectifying effect of the junction transition.

12. The voltage converter circuit according to claim 1, the voltage converter circuit being implemented for the clocked conversion of the input voltage applied at the input of the voltage converter into an output voltage available at an output of the voltage converter;
wherein the energy storage comprises a first coil, wherein a terminal of the coil is coupled to the input of the voltage converter;
wherein the voltage converter circuit comprises a controllable rectifying element connected in series with the first coil;
wherein the voltage converter circuit comprises an output capacitor interconnected with the controllable rectifying element and implemented to store a charge so that at the output capacitor an output voltage is available; and
wherein the feedback circuit is implemented to provide the feedback signal depending on a change of the energy stored in the first coil or depending on an amount of energy stored in the first coil,
wherein the switch arrangement is implemented to couple the first coil to a reference potential to supply energy to the first coil;
wherein the switch arrangement comprises a first transistor and a second transistor connected in parallel to each other;
wherein the first transistor comprises a smaller threshold voltage than the second transistor, according to amount;
wherein a control terminal of the first transistor is wired up such that the first transistor is active in a startup phase of the voltage converter to enable a coupling of the first coil to the reference potential to build up a current flow through the first coil;
wherein the feedback circuit comprises a switchable capacitive element which is implemented to couple the feedback signal to the control terminal of a second switch,
wherein the switchable capacitive element is implemented to provide a stronger coupling effect in a startup phase than after the startup phase,
wherein a control terminal of the second transistor is wired up such that the second transistor enables a clocked coupling of the first coil to the reference potential after the startup phase; and
wherein the controlled rectifier element is implemented to transmit charges from the first coil to the output capacitor when the switch arrangement is switched off.

13. The voltage converter circuit according to claim 12, wherein the feedback circuit comprises a second coil and a third coil which are inductively coupled to the first coil,
wherein a tap between the second coil and the third coil is connected to capacities which are connected in parallel, wherein one of the capacities is switchable via a capacity changeover junction field effect transistor, wherein a terminal of the third coil is coupled to the control terminal of the first transistor and to a control terminal of the capacity changeover junction field effect transistor; and wherein a terminal of the second coil is coupled via a resistor/capacity element to a reference potential, wherein the two capacities connected in parallel are implemented to cause a stronger coupling between the tap and the control terminal of the second transistor in the startup phase than after the startup phase, to couple a feedback signal from the tap to the control terminal of the second transistor.

14. A method for a clocked supply of energy to an energy storage, based on an input voltage applied at an input of a voltage converter circuit, comprising:

supplying energy to the energy storage of the voltage converter circuit in a startup phase by activating a first switch; and supplying energy in a clocked way to the energy storage of the voltage converter circuit by activating a second switch, wherein activating the second switch in the startup phase comprises coupling a feedback signal to the control terminal of the second switch via a coupling, and wherein the method comprises a reduction of the coupling after the startup phase, wherein the second switch is connected in parallel to the first switch and the second switch comprises a higher turn-on voltage than the first switch, according to amount.

15. A voltage converter circuit for a clocked supply of energy to an energy storage based on an input voltage which is applied to an input of the voltage converter circuit, comprising:

an energy storage;

a switch arrangement comprising a control terminal, wherein the switch arrangement is coupled to the energy storage to supply energy in a switchable way to the energy storage depending on a control signal applied to the control terminal;

a feedback circuit which is implemented to provide a feedback signal depending on a change of the energy stored in the energy storage or depending on an amount of energy stored in the energy storage, wherein the feedback circuit comprises a switchable coupling element which is implemented to couple the feedback signal to the control terminal, and wherein the switchable coupling element is implemented to provide a stronger coupling effect in a startup phase of the voltage conversion than after the startup phase;

wherein the feedback circuit comprises a switchable capacitive element which is implemented to couple the voltage induced in the inductive element to the control terminal of the switch arrangement, and wherein the switchable capacitive element is implemented to provide a stronger coupling effect between the inductive element and the control terminal in the startup phase than after the startup phase, by increasing the overall capacity of the capacitive element in the startup phase of the voltage converter circuit.

16. The voltage converter circuit according to claim 15, wherein the switchable coupling element comprises two capacities connected in parallel, wherein one of the capacities may be switched on and switched off via a start assistance switch.

17. The voltage converter circuit according to claim 15, wherein the switchable capacitive element comprises a start assistance switch which is wired up so that the switchable capacitive element provides a stronger coupling effect in the start-up phase than after the start-up phase, wherein the voltage converter circuit comprises a rectifying device and a capacitive element which are implemented to build up a potential working towards switching off the start assistance switch.

18. A method for the clocked supply of energy to an energy storage based on an input voltage applied at an input of a voltage converter circuit, comprising:

supplying energy in a switchable way to the energy storage of the voltage converter circuit depending on a control signal, providing a feedback signal depending on a change of the energy stored in the energy storage or depending on an amount of energy stored in the energy storage, and coupling the feedback signal to the control terminal of the voltage converter circuit using a switchable, capacitive element, to acquire the control signal, wherein in a startup phase a stronger coupling effect between the feedback signal and the control terminal is provided than after the startup phase, by increasing the overall capacity of the capacitive element in the start-up phase.

* * * * *